US009893852B2

(12) United States Patent
Yerramalli et al.

(10) Patent No.: US 9,893,852 B2
(45) Date of Patent: Feb. 13, 2018

(54) COORDINATION OF CLEAR CHANNEL ASSESSMENT ACROSS COMPONENT CARRIERS IN AN UNLICENSED OR SHARED SPECTRUM

(71) Applicant: QUALCOMM Incorporated, San Diego, CA (US)

(72) Inventors: Srinivas Yerramalli, San Diego, CA (US); Tao Luo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 14/460,996

(22) Filed: Aug. 15, 2014

(65) Prior Publication Data

US 2015/0049715 A1 Feb. 19, 2015

Related U.S. Application Data

(60) Provisional application No. 61/867,420, filed on Aug. 19, 2013.

(51) Int. Cl.
*H04W 16/14* (2009.01)
*H04L 5/00* (2006.01)
*H04L 27/00* (2006.01)
*H04L 5/14* (2006.01)

(52) U.S. Cl.
CPC ............ *H04L 5/0044* (2013.01); *H04L 5/001* (2013.01); *H04L 5/1469* (2013.01); *H04L 27/0006* (2013.01); *H04W 16/14* (2013.01)

(58) Field of Classification Search
CPC ..................................................... H04L 5/0044
See application file for complete search history.

(56) References Cited

U.S. PATENT DOCUMENTS

| 2003/0016647 A1* | 1/2003 | Margon ............ H04L 12/4013 370/342 |
| 2009/0149208 A1 | 6/2009 | Huttunen et al. |
| 2012/0307744 A1 | 12/2012 | Charbit et al. |

(Continued)

FOREIGN PATENT DOCUMENTS

| WO | WO-2011135392 A1 | 11/2011 |
| WO | WO-2012101481 A1 | 8/2012 |

OTHER PUBLICATIONS

ISA/EPO, International Search Report and Written Opinion of the International Searching Authority, Int'l. App. No. PCT/US2014/051499, Nov. 14, 2014, European Patent Office, Rijswijk, NL, 12 pgs.

*Primary Examiner* — Fan Ng
(74) *Attorney, Agent, or Firm* — Liem T. Do

(57) ABSTRACT

Methods, systems, and devices are described for clear channel assessments (CCAs) on multiple component carriers transmitted using an unlicensed or shared spectrum. A set of component carriers may be identified for transmission of communications signals on the unlicensed or shared spectrum, and a CCA for one component carrier of the set may be staggered to occur at a different time than a CCA for a different component carrier of the set off component carriers. The staggering of CCAs may allow for CCA to be performed at different times for different component carriers, thus increasing opportunities to gain channel access in the unlicensed or shared spectrum.

30 Claims, 14 Drawing Sheets

(56) References Cited

U.S. PATENT DOCUMENTS

| | | | |
|---|---|---|---|
| 2013/0201884 A1 | 8/2013 | Freda et al. | |
| 2013/0203458 A1* | 8/2013 | Charbit | H04W 52/34 455/522 |
| 2013/0208587 A1* | 8/2013 | Bala | H04W 16/14 370/230 |
| 2013/0322279 A1* | 12/2013 | Chincholi | H04W 24/10 370/252 |
| 2014/0161002 A1* | 6/2014 | Gauvreau | H04W 16/24 370/280 |
| 2015/0103782 A1* | 4/2015 | Xu | H04L 5/001 370/329 |

* cited by examiner

COORDINATION OF CLEAR CHANNEL ASSESSMENT ACROSS COMPONENT CARRIERS IN AN UNLICENSED OR SHARED SPECTRUM

CROSS REFERENCES

The present application for patent claims priority to U.S. Provisional Patent Application No. 61/867,420 by Yerramalli et al., entitled "Subframe Staggering Across Component Carriers in LTE-U," filed Aug. 19, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of WLANs to offload some of the traffic and/or signaling of a cellular network. WLANs (or WiFi networks) are attractive because, unlike cellular networks that operate in a licensed spectrum, WiFi networks generally operate in an unlicensed spectrum. However, access to unlicensed spectrum may need to be coordinated to ensure that access points of the same or different operator deployments, using the same or different techniques for accessing the unlicensed spectrum, may co-exist and make effective use of the unlicensed spectrum.

SUMMARY

The described features generally relate to one or more improved systems, methods, and/or devices for wireless communications, and more particularly, to coordination of clear channel assessments (CCAs) on multiple component carriers transmitted using an unlicensed spectrum. A set of component carriers may be identified for transmission of communications signals on the unlicensed spectrum, and a CCA for one or more component carriers of the set may be staggered to occur at a different time than a CCA for a different component carrier of the set of component carriers. The staggering of CCAs may allow for CCA to be performed at different times for different component carriers. Thus, for example, in the event interference prevents channel access at a first CCA opportunity on a first component carrier, a second CCA opportunity may allow channel access on a second component carrier at a second CCA opportunity that may occur prior to another CCA opportunity on the first component carrier. The timing of CCAs for different component carriers may be coordinated among multiple base stations to provide a coordinated system for wireless communications using an unlicensed spectrum.

According to a first set of examples, a method for wireless communications is provided. The method generally includes identifying a set of component carriers for transmission of communications signals on an unlicensed spectrum, and staggering a clear channel assessment (CCA) for at least one component carrier of the set of component carriers to occur at a different time than a CCA for a different component carrier of the set of component carriers. In some examples, the method may also include synchronizing CCAs for each of the set of component carrier frequencies across a plurality of base stations. The staggering may include, for example, staggering CCAs of the set of component carriers according to a staggering offset received as part of a network configuration. Such a staggering offset may be transmitted to a user equipment (UE) in a system information block (SIB) or RRC configuration/reconfiguration message, for example. Additionally or alternatively, staggering may include staggering a series of CCAs for at least one component carrier of the set of component carriers to occur at different times than a series of CCAs for at least one other of the set of component carriers. The staggering may also include staggering of CCA exempt transmissions (CETs). For example, CETs of the at least one component carrier may be staggered to occur at a different time than CETs of the at least one other component carrier of the set of component carriers.

According to some examples, the communications signals transmitted on each component carrier may include a number of frames, each of the of frames including a CCA subframe, and the staggering may include selecting different subframes as the CCA subframe for each of the component carriers. In other examples, the set of component carriers may comprise two or more secondary downlink (SDL) carriers transmitted on the unlicensed spectrum. The set of component carriers, in some examples, may include two or more carrier aggregation (CA) or stand alone (SA) carriers transmitted on the unlicensed spectrum. In some examples, each component carrier may be configured to transmit communications signals according to a time division duplex (TDD) transmission scheme, and two or more of the component carriers may have different TDD uplink/downlink (UL/DL) configurations.

Additionally or alternatively, the method may include transmitting a communications signal on a first component carrier, and measuring, while transmitting the communications signal on the first component carrier, received signals on the second component carrier for CCA. In some examples, the set of component carriers may include a first component carrier transmitted substantially at a first frequency and a second component carrier transmitted substantially at a second frequency. The first frequency and second frequency may belong to, for example, different frequency bands, and the staggering may include staggering CCAs of the first and second component carriers to occur at a different times. In some examples, the first frequency and second frequency may be non-contiguous frequencies of a same frequency band, and the staggering may include staggering CCAs of the first and second component carriers to occur at a different times.

According to a second set of examples, an apparatus for wireless communications is provided. The apparatus generally includes a processor and a memory in electronic communication with the processor, the processor being configured to identify a set of component carriers for transmission of communications signals on an unlicensed spectrum, and stagger a clear channel assessment (CCA) for at least one component carrier of the set of component carriers to occur at a different time than a CCA for a different component carrier of the set of component carriers. In certain examples, the processor may be configured to perform one or more aspects of the functionality described above with reference to the first set of examples.

According to a third set of examples, a method for wireless communications is provided. The method generally includes receiving communications signals on a set of component carriers that are transmitted on an unlicensed spectrum, receiving staggering information indicating that a clear channel assessment (CCA) for at least one component carrier of the set of component carriers is to occur at a different time than a CCA for another component carrier of the set of component carriers, and performing CCA operations according to the staggering information. The CCAs for each component carrier of the set of component carriers may be, for example, staggered according to a staggering offset.

Additionally or alternatively, the method may include receiving the staggering offset from a base station in a system information block (SIB) or RRC configuration/reconfiguration message. In some examples, the communications signals transmitted on each component carrier may include a number of frames, each of the frames may include a CCA subframe, and the staggering information may identify different subframes for each component carrier as the CCA subframe. In some examples, the set of component carriers may include two or more secondary downlink (SDL) carriers, carrier aggregation (CA) carriers, or stand alone (SA) carriers transmitted on the unlicensed spectrum. The set of component carriers, in some examples, may include a first component carrier transmitted at a first frequency and a second component carrier transmitted at a second frequency that belongs to a different frequency band than the first frequency, and the CCAs of the first and second component carriers may be staggered to occur at a different times. In some examples, the set of component carriers may include a first component carrier transmitted substantially at a first frequency and a second component carrier transmitted substantially at a second frequency that belongs to a same frequency band as the first frequency, and CCAs of the first and second component carriers may be synchronized, with one or more CCAs for one or more other component carriers of the set of component carriers being staggered to occur at a different time than the synchronized CCAs of the first and second component carriers.

According to a fourth set of examples, an apparatus for wireless communications is provided. The apparatus generally includes a processor, a memory in electronic communication with the processor, and instructions stored in the memory. The instructions may be executable by the processor to cause the processor to receive communications signals on a set of component carriers that are transmitted on an unlicensed spectrum, receive staggering information indicating that a clear channel assessment (CCA) for at least one component carrier of the set of component carriers is to occur at a different time than a CCA for another component carrier of the set of component carriers, and perform CCA operations according to the staggering information. In certain examples, the instructions may further cause the processor to perform one or more aspects of the functionality described above with reference to the third set of examples.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
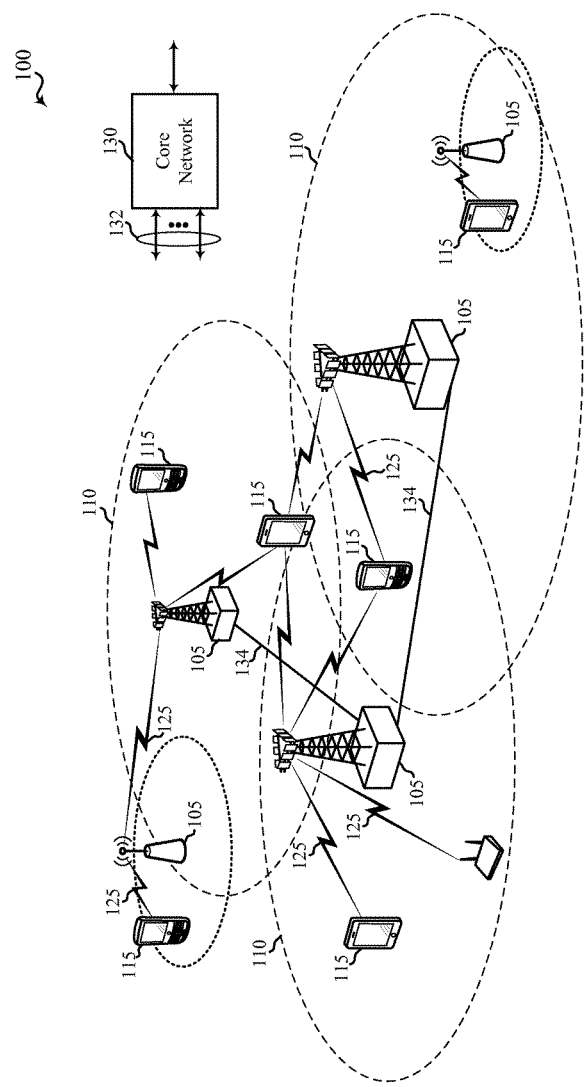
FIG. 1 shows a diagram of a wireless communications system.

The present disclosure is directed to methods, apparatuses, systems, and devices in which an unlicensed spectrum (e.g., a spectrum typically used for WiFi communications) may be used for cellular communications (e.g., Long Term Evolution (LTE) communications). In particular, the disclosed example methods, apparatuses, systems and devices are directed to improving channel access opportunities in the unlicensed spectrum.

As offloading of traffic from cellular networks to the unlicensed spectrum continues to increase, network operators continue to look for opportunities to enhance data transmission capacity. One method may involve coordinating the use of unlicensed spectrum to ensure that access points of the same or different operator deployments, using the same or different techniques for accessing the unlicensed spectrum, may co-exist within the unlicensed spectrum and that the unlicensed spectrum is being used efficiently.

In some cases, the co-existence and the more efficient use of the unlicensed spectrum may be facilitated by coordinating clear channel assessments (CCAs) or CCA exempt transmissions (CETs) performed by different devices or nodes that want to access the unlicensed spectrum. In some deployments, a CCA is performed by a device prior to gaining access to a channel and transmitting using an unlicensed spectrum, to determine if a particular carrier is available. The CET, on the other hand, may be a regularly scheduled transmission for a node that is not subject to CCA or other listen before talk (LBT) requirements. In certain situations, the CCA may be performed a number of times before the channel becomes available. Coordinating CCAs and CETs to provide enhanced access to the unlicensed spectrum may involve transmitting CCAs or CETs on multiple subcarriers using the unlicensed spectrum. In some cases, the methods may involve identifying a set of component carriers for transmission of communications signals on the unlicensed spectrum, and staggering CCAs or CETs across the component carriers so that a CCA or CET of one or more component carriers of the set of component carriers occurs at a different time than a CCA or CET for a different component carrier of the set of component carriers. The staggering of CCAs and CETs such that CCAs and CETs for different component carriers are performed at different times may provide faster access to a channel especially in cases when, for example, interference may be present. In particular, in the event interference prevents channel access at a first CCA opportunity on a first component carrier, a second CCA opportunity may allow channel access on a second component carrier at a second CCA opportunity that may occur prior to another CCA opportunity on the first component carrier. In some deployments, the CCA staggering may be performed for various modes of operations that combine LTE communications over licensed and unlicensed spectrum. The timing of CCAs for different component carriers may also be coordinated among multiple base stations to provide a coordinated system for wireless communications using an unlicensed spectrum.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The wireless communications system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various examples. Some of the access points 105 may communicate control information and/or user data with the core network 130 through backhaul links 132. In some examples, some of the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some examples, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some examples, the wireless communications system 100 may include an LTE/LTE-A communications system (or network) that supports one or more modes of operation or deployment scenarios in the unlicensed frequency spectrum, and may employ multiple component carriers having staggered CCAs. In other examples, the wireless communications system 100 may support wireless communications using an unlicensed spectrum and an access technology different from LTE conducted over an unlicensed, or a licensed spectrum and an access technology different from LTE/LTE-A. In LTE/LTE-A communications systems, the term evolved NodeB or eNB may be generally used to describe of the access points 105. The wireless communications system 100 may be a heterogeneous network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul links 132 (e.g., 51, etc.). The eNBs 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum, an unlicensed spectrum, or both. Similarly, the uplink transmissions may be made using a licensed spectrum, an unlicensed spectrum, or both.

In some examples of the wireless communications system 100, various deployment scenarios for LTE communications over an unlicensed spectrum may be supported including a supplemental downlink mode (SDL), carrier aggregation mode (CA) and stand alone mode (SA). In the SDL mode LTE downlink traffic in a licensed spectrum may be offloaded to an unlicensed spectrum. In the CA mode both LTE downlink and uplink capacity may be offloaded from a licensed spectrum to an unlicensed spectrum. The SA mode may be used for transmissions of the LTE downlink and uplink communications between a base station (e.g., eNB) and a UE in an unlicensed spectrum. In various deployments, LTE and other base stations and UEs may support one or more of these or similar modes of operation. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum. Transmissions using the unlicensed spectrum may be carried using one or more carrier frequencies in the unlicensed frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In many deployments, as mentioned above, a device seeking to transmit using unlicensed spectrum may be required to verify that the spectrum is available for its use. That is, the device may be required to verify that the spectrum is not already in use by one or more other devices. Availability of the unlicensed spectrum, in some examples, may be determined by performing a CCA operation, which generally involves checking that the desired spectrum is not otherwise occupied prior to initiating transmissions. The CCA operations, according to some examples, may be performed at periodic intervals, such as every 10 ms. A transmitting entity, such as, for example, an eNB 105, that desires to access a channel may perform CCA to determine if a particular carrier frequency in the unlicensed spectrum is occupied. If the particular carrier frequency in the unlicensed spectrum is occupied, the eNB 105 may need to wait until the next CCA opportunity before attempting to obtain channel access again on the associated carrier frequency. In deployments that provide CCA opportunities once every 10 ms, the eNB 105 would thus need to wait 10 ms before attempting another channel access.

In order to enhance system efficiency and reduce latency, in some examples, additional CCA opportunities for channel access may be provided before the next scheduled CCA opportunity. According to various examples described herein, in deployments that utilize multiple component carriers, CCA opportunities may be staggered across different component carriers to provide more frequent opportunities for channel access. In some examples, CCA opportunities may be coordinated across multiple eNBs 105. Additional details regarding the implementation of LTE over the unlicensed spectrum deployment scenarios or modes of operation in a system such as the wireless communications system 100, as well as other features and functions related to the operation of LTE over the unlicensed spectrum, are provided below with reference to FIGS. 2-13.

Figure 2:
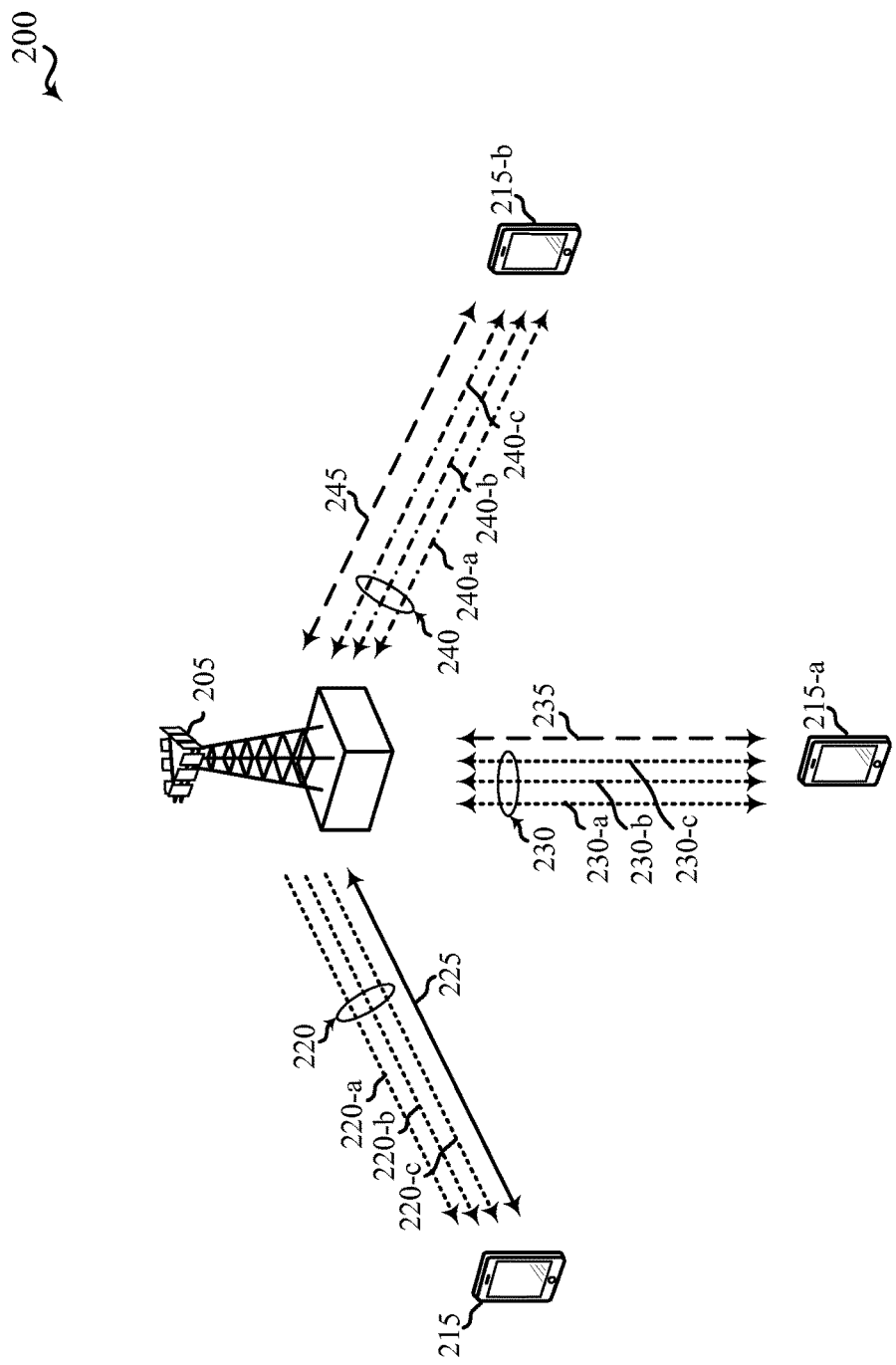
FIG. 2 shows a diagram of a wireless communications system that illustrates examples of deployment scenarios for using LTE in an unlicensed spectrum according to various examples.

Turning next to FIG. 2, a wireless communications system 200 illustrates examples of a supplemental downlink mode (SDL), a carrier aggregation mode (CA) and a stand along mode (SA) for an LTE network that supports LTE over an unlicensed spectrum. The wireless communications system 200 may be an example of portions of the wireless communications system 100 described with reference to FIG. 1. Moreover, the eNB 205 may be an example of one of the access points 105 of FIG. 1, while the UEs 215 may be examples of the UEs 115 described with reference to FIG. 1.

In an example of the SDL mode in wireless communications system 200, the eNB 205 may transmit OFDMA communications signals to a UE 215 using downlink 220, which may include multiple component carriers. In the example of FIG. 2, downlink 220 includes three SDL component carriers, namely a first SDL carrier 220-a, a second SDL carrier 220-b, and a third SDL carrier 220-c. Each SDL component carrier 220-a, 220-b, and 220-c may be associated with a frequency in an unlicensed spectrum. The eNB 205 may transmit OFDMA communications signals to the same UE 215 using a bidirectional link 225 and may receive SC-FDMA communications signals from that UE 215 using the bidirectional link 225. The bidirectional link 225 may be associated with a frequency in a licensed spectrum. The downlink 220 in the unlicensed spectrum and the bidirectional link 225 in the licensed spectrum may operate concurrently. The downlink 220 may provide a downlink capacity offload for the eNB 205. In some examples, the downlink 220 may be used for unicast services (e.g., addressed to one UE) or for multicast services (e.g., addressed to several UEs). This mode of operation may be used by any service provider (e.g., a traditional mobile network operator or MNO) that uses a licensed spectrum and needs to relieve some of the traffic and/or signaling congestion.

In one example of the CA mode in wireless communications system 200, the eNB 205 may transmit OFDMA communications signals to a UE 215-a using a bidirectional link 230 and may receive SC-FDMA communications signals from the same UE 215-a using the bidirectional link 230. In the example of FIG. 2, bidirectional link 230 includes three CA component carriers, namely a first CA carrier 230-a, a second CA carrier 230-b, and a third CA carrier 230-c. Each CA component carrier 230-a, 230-b, and 230-c may be associated with a frequency in an unlicensed spectrum. The eNB 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency in a licensed spectrum. The bidirectional link 230 may provide a downlink and uplink capacity offload for the eNB 205. Like the SDL mode described above, this mode may be used by any service provider (e.g., an MNO) that uses a licensed spectrum and needs to relieve some of the traffic and/or signaling congestion.

In an example of the SA mode in wireless communications system 200, the eNB 205 may transmit OFDMA communications signals to a UE 215-b using a bidirectional link 240 and may receive SC-FDMA communications signals from the same UE 215-b using the bidirectional link 240. In the example of FIG. 2, bidirectional link 240 includes three SA component carriers, namely a first SA carrier 240-a, a second SA carrier 240-b, and a third SA carrier 240-c. Each CA component carrier 240-a, 240-b, and 240-c may be associated with a frequency in an unlicensed spectrum. The eNB 205 may also transmit OFDMA communications signals to the same UE 215-b using a bidirectional link 245 and may receive SC-FDMA communications signals from the same UE 215-b using the bidirectional link 245. The bidirectional link 245 may be associated with the frequency of link 230 in the licensed spectrum. The bidirectional link 240 may provide a downlink and uplink capacity offload for the eNB 205. This example and those provided above are presented for illustrative purposes and there may be other similar modes of operation or deployment scenarios that combine LTE communications over licensed and unlicensed spectrums for capacity offload.

As described above, the typical service provider that may benefit from the capacity offload offered by using LTE in an unlicensed band is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the SDL mode, control for LTE transmissions over the unlicensed spectrum may be transported over the LTE uplink (e.g., uplink portion of the bidirectional link 225). One of the reasons to provide downlink capacity offload is because data demand is largely driven by downlink consumption. Moreover, in this mode, there may be reduced regulatory impact since the UE 215 is not transmitting in the unlicensed spectrum.

In the CA mode, data and control may be communicated over the licensed spectrum (e.g., bidirectional links 235 and 245) while data may be communicated in over the unlicensed spectrum (e.g., bidirectional links 230 and 240). The carrier aggregation mechanisms supported when using the unlicensed spectrum may fall under a hybrid frequency division duplexing-time division duplexing (FDD-TDD) carrier aggregation or a TDD-TDD carrier aggregation with different symmetry across component carriers.

In any of the various operation modes, communications may be transmitted on one or multiple carrier frequencies in the unlicensed spectrum. According to various examples, as mentioned above, different component carriers may have associated CCA opportunities that are staggered in time, thus providing additional opportunities for channel access. In the example of FIG. 2, eNB 205, seeking to establish a SDL downlink 220 with UE 215 may perform a CCA on the first SDL carrier 220-a during a first CCA opportunity associated with the first SDL carrier 220-a. In the event that eNB 205 is not able to access channel using the first SDL carrier 220-*a*, the eNB may perform CCA on the second SDL carrier 220-*b* during a second CCA opportunity on the second SDL carrier 220-*b*. The second CCA opportunity may occur after the first CCA opportunity, but before another CCA opportunity on the first SDL carrier 220-*a*. Thus, if eNB 205 successfully gains channel access during the second CCA opportunity, the SDL downlink 220 may be established more quickly. The CA and SA modes of operation may operate in a similar manner. Some examples of such CCA opportunity staggering on different component carriers are illustrated in FIGS. 3-6.

Figure 3:
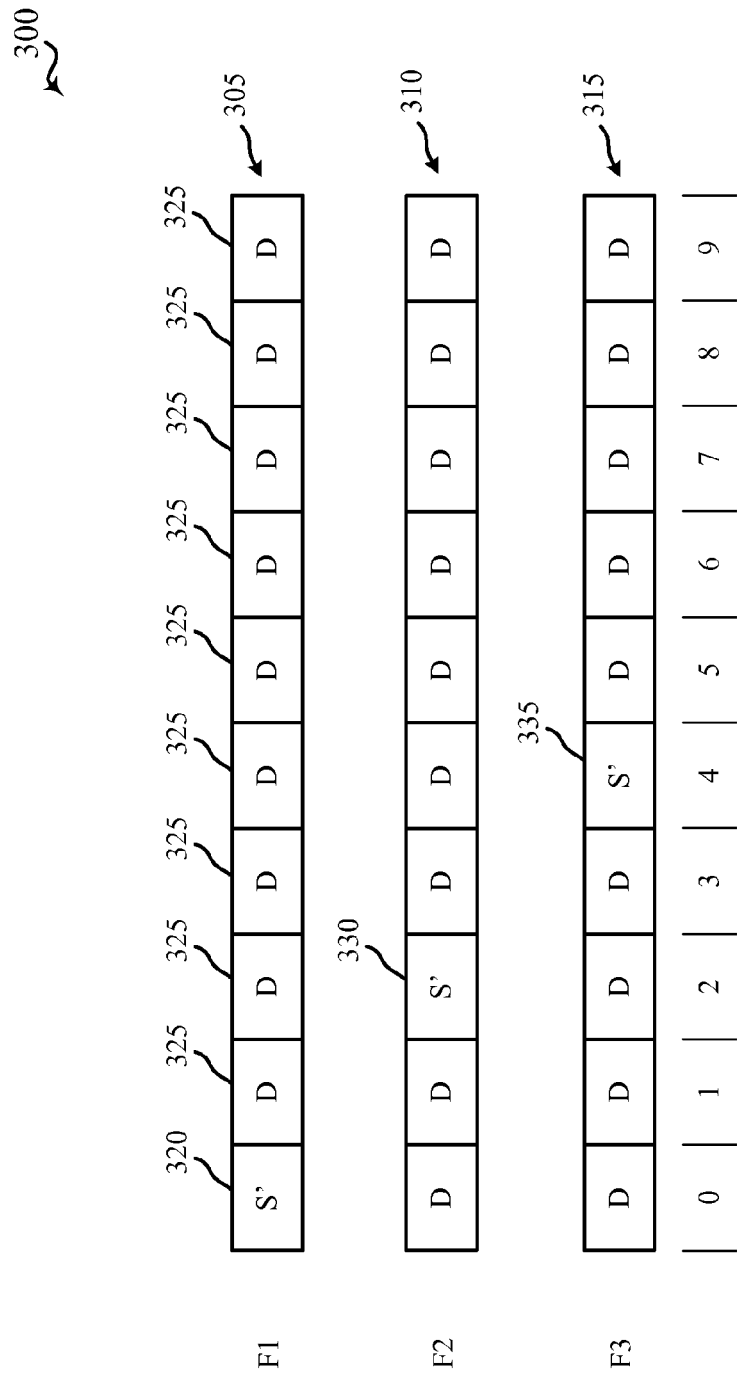
FIG. 3 illustrates an example of different supplemental downlink component carriers in an unlicensed spectrum, and staggered CCA opportunities associated with each component carrier according to various examples.

FIG. 3 illustrates an example staggering pattern 300 of CCA opportunities for multiple component carriers in a SDL mode using an unlicensed spectrum according to various examples. In the example of FIG. 3, component carriers in the unlicensed spectrum include three component carrier frequencies F1, F2, and F3 that may be used to transmit data frames 305, 310, and 315, respectively. In some examples, the unlicensed component carrier frequencies F1-F3 and transmitted data frames 305-315 may be examples of carrier frequencies and data frames used by one or more of the eNBs 105, 205, and/or UEs 115, 215 described with reference to FIGS. 1 and/or 2.

The frame structure for data frames 305, 310, and 315 may include an LTE radio frame having ten subframes (e.g., subframes 0 through 9). In the SDL mode, each data frame 305, 310, 315, may have nine downlink (D) subframes, and one special (S') subframe. In the example of FIG. 1, a first component carrier transmitted on frequency F1 may carry data frame 305 that includes S' subframe 320 in subframe 0, and D subframes in subframes 1 through 9. The D subframes 325 may collectively define a channel occupancy time of the LTE radio frame, and at least part of the S' subframe 320 may define a channel idle time. According to some examples, the S' subframe 320 has a duration of one millisecond, and may include one or more CCA slots (e.g., time slots) in which the transmitting devices contending for a particular channel of an unlicensed spectrum may perform their CCAs. The S' subframe may also be referred to herein as a CCA subframe. The data frames 305, 310, 315 transmitted on each component carrier thus provide a series of CCA subframes that provide a CCA opportunity once during the transmission of each data frame, or once every 10 ms for each component carrier.

As discussed above, staggering of CCAs for different component carriers may provide a transmitting device with additional opportunities to perform CCA in order to gain access to a desired transmission channel. In the example of FIG. 3, data frame 310 includes an S' subframe 330 in subframe 2, and frame 315 includes an S' subframe 335 in subframe 4. Accordingly, in the implementation shown in FIG. 3, a transmitting device may have CCA opportunities during subframes 0, 2, and 4. In other examples, additional component carriers may be present, which may provide CCA opportunities in still additional subframes. According to some examples, various eNBs, such as eNBs 105, 205, and/or UEs 115, 215 of FIGS. 1 and 2, and/or other transmitters that may transmit in the unlicensed spectrum may also synchronize CCAs for different component carriers. The synchronization of the information between the various eNBs may take place, for example, via backhaul links (e.g. X2 interface). Thus, a number of different eNBs and/or other transmitters may operate in a coordinated fashion to provide CCA opportunities that are synchronized.

In some examples, S' subframes 320, 330, and 335, as well as any other special subframes of other different component carriers, may be set according to a network configuration that is provided to the eNB and/or other transmitter. The network configuration may include, for example, a listing of different component carrier frequency bands and a position of the S' subframe for each respective component carrier frequency band. In some examples, the position of the S' subframe for each component carrier frequency band may be provided as a staggering offset. In some examples, synchronization may also be applied to transmitters of different MNOs. A UE that operates in such a system may, according to some examples, receive configuration information including staggering information, such as staggering offsets for different component carriers, in a system information block (SIB) or RRC configuration/reconfiguration message.

While the example of FIG. 3 illustrates S' subframes 320, 330, and 335 in different subframes within each of the data frames 305, 310, 315, in some examples one or more component carriers may have S' subframes with the same subframe offset, with at least one other component carrier having a S' subframe with a different subframe offset. According to various examples, a CCA may be performed by the transmitter, such as an eNB, on each component carrier separately, and thus such a transmitter may be configured to transmit a communications signal on a first component carrier frequency F1 (e.g., downlink subframe 325 during subframe 2), while measuring received signals on a second component carrier frequency F2 to perform CCA on the second component carrier frequency F2 (e.g., during S' subframe 330). The different component carrier frequencies F1-F3 may belong to the same frequency band (e.g., intra-band component carriers), or one or more of the component carrier frequencies F1-F3 may belong to a different frequency band (e.g., inter-band component carriers). In some examples, intra-band component carriers may be configured to have synchronized special subframes, so as to have synchronized CCA, while inter-band component carriers may be configured to have staggered special subframes. In other examples, non-contiguous component carrier frequencies may be configured with staggered subframes, while contiguous component carrier frequencies may be configured to have synchronized special subframes.

Figure 4:
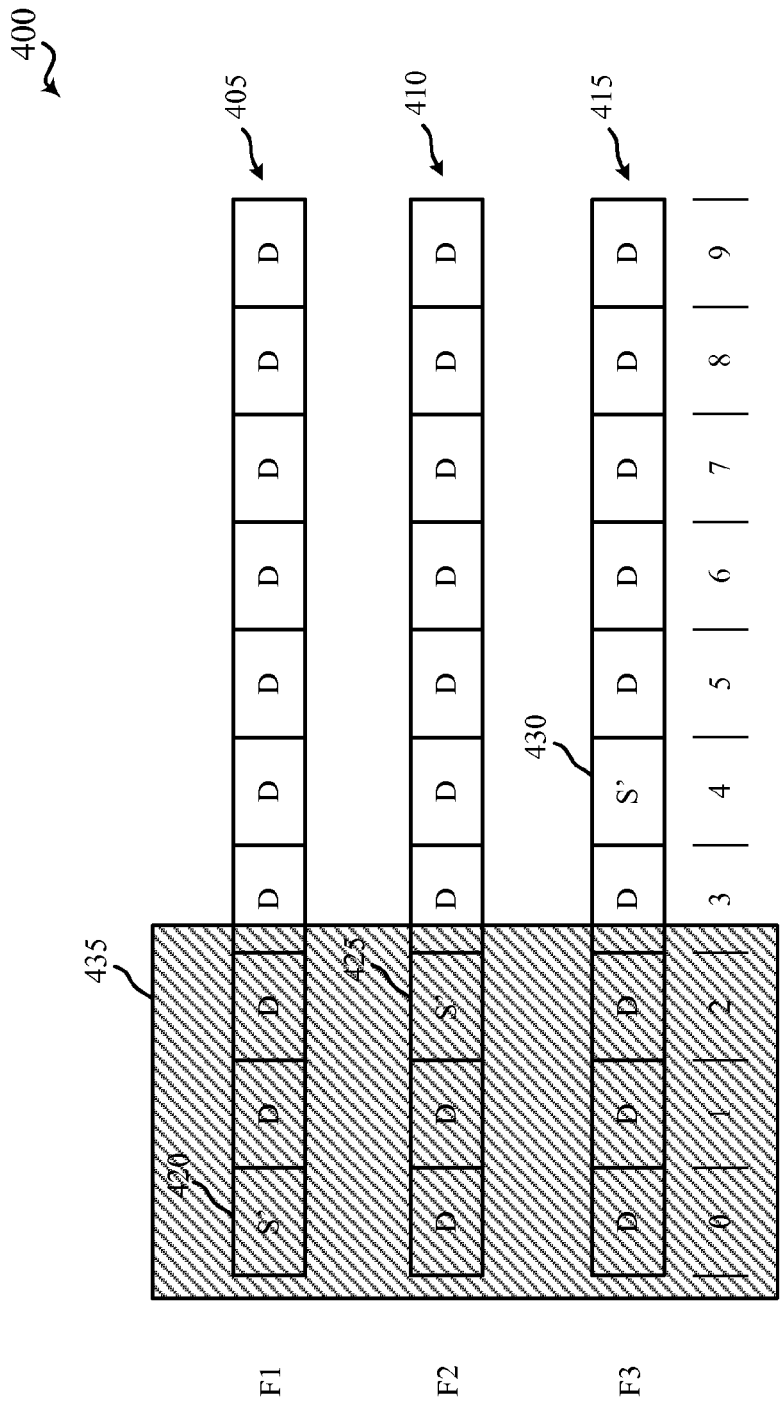
FIG. 4 illustrates an example of different supplemental downlink component carriers in an unlicensed spectrum, and staggered CCA opportunities that may allow faster channel access in the event of interference, according to various examples.

FIG. 4 illustrates an example staggering pattern 400 of CCA opportunities for multiple component carriers in a SDL mode using an unlicensed spectrum, in which interference may be present during a CCA subframe. In particular, the example of FIG. 4 illustrates how in the event of interference during one of the CCA opportunities of one of the component carriers, a CCA may be performed on another component carrier to gain channel access. As shown in FIG. 4, frames 405-415 may be transmitted using multiple component carriers on frequencies F1-F3. Each frame 405, 410, and 415 includes a corresponding special (S') subframe 420, 425, and 430, that each may include one or more CCA slots (e.g., time slots) in which the transmitting devices contending for a particular channel of an unlicensed spectrum may perform their CCAs.

In the example of FIG. 4, interference 435 is shown as being present during subframes 0 through 3. The observed interference may, for example, be an interference from a WiFi transmitter. The WiFi interference may be wideband, using 40 MHz, 80 MHz, or 160 MHz bands, and may cause the CCA operation to fail on each of subcarrier frequencies F1-F3 in which a CCA is attempted when the interference 435 is present. In the example of FIG. 4, the first frame 405 includes an S' subframe in subframe 0, and the second frame 410 includes a S' subframe in subframe 3. The interference 435 in this example results in a failed CCA on subcarrier frequencies F1 and F2. A CCA performed during S' subframe 430 is performed after the interference 435 stops, and may thus result in a successful CCA and lead to channel acquisition for the third component carrier transmitted on frequency F3. Thus, a transmitter, such as eNB 105, 205, and/or UE 115, 215, may be able to successfully accesses a channel of the third component carrier transmitted on frequency F3. The transmitter may then re-attempt to gain channel access for the first and second component carriers on frequencies F1 and F2 in order to enhance the total bandwidth available for the SDL communications. Thus, while the full bandwidth of all of the component carriers transmitted on carrier frequencies F1-F3 may not be obtained for up to 10 ms, communications may be initiated using the third component carrier transmitted on frequency F3, and communications may begin more quickly than if the CCA for each of the component carriers were performed during the same subframe.

Figure 5:
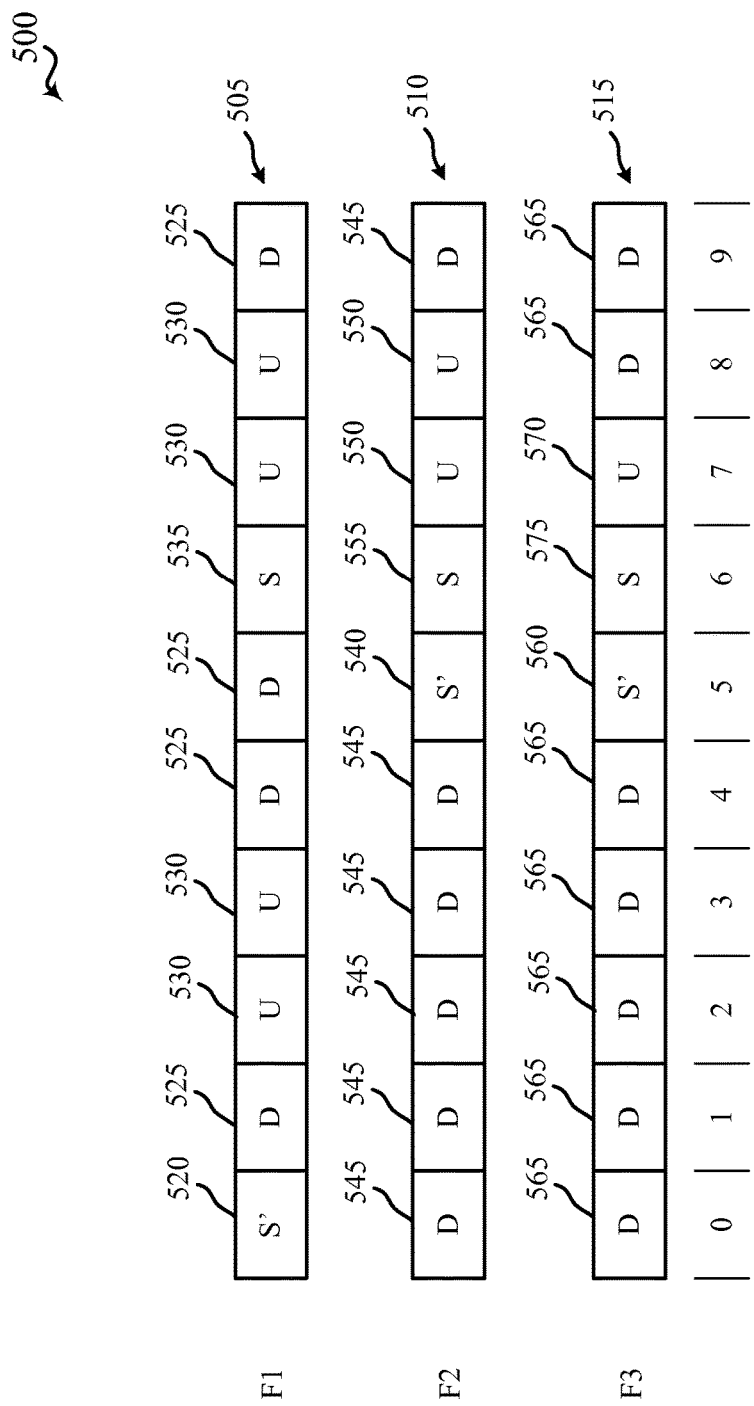
FIG. 5 illustrates an example of different carrier aggregation or stand alone mode component carriers in an unlicensed spectrum, and staggered CCA opportunities associated with each component carrier according to various examples.

FIG. 5 illustrates an example staggering pattern 500 of CCA opportunities for multiple component carriers in a CA or SA modes using an unlicensed spectrum according to various examples. In the example of FIG. 5, component carriers in the unlicensed spectrum include first component carrier transmitted in first component carrier frequency F1, second component carrier transmitted on second component carrier frequency F2, and third component carrier transmitted on third component carrier frequency F3. The three component carrier frequencies F1, F2, and F3 may be used to transmit data frames 505, 510, and 515, respectively. In some examples, the unlicensed component carrier frequencies F1-F3 and transmitted data frames 505-315 may be examples of carrier frequencies and data frames used by one or more of the eNBs 105, 205, and/or UEs 115, 215 described with reference to FIGS. 1 and/or 2.

The frame structure for data frames 505, 510, and 515 may include an LTE radio frame having ten subframes (e.g., subframes 0 through 9). In the CA or SA mode illustrated in FIG. 5, each data frame 505, 510, 515, may have a different time division duplex (TDD) uplink/downlink (UL/DL) configurations. In the example of FIG. 5, component carrier frequency F1 may carry frame 505 that includes special (S') subframe 520 in subframe 0, includes downlink (D) subframes 525 in subframes 1, 4, 5, and 9, includes uplink (U) subframes 530 in subframes 2, 3, 7, and 8, and includes a TDD special (S) subframe 535. The D subframes 525 may collectively define a channel occupancy time of the LTE radio frame, and at least part of the S' subframe 520 and S subframe 535 may define a channel idle time. According to some examples, the S' subframe 520 has a duration of one millisecond, and may include one or more CCA slots (e.g., time slots) in which the transmitting devices contending for a particular channel of an unlicensed spectrum may perform their CCAs. Similarly, the second frame 510 may include S' subframe 540, D subframes 545, U subframes 550, and TDD S subframe 555. Likewise, the third frame 515 may include special S' subframe 560, D subframes 565, U subframes 570, and TDD S subframes 575.

As discussed above, CCAs for different component carrier frequencies may be staggered, thus providing additional opportunities to perform CCA by a transmitting device in order to gain access to a desired transmission channel. In the example of FIG. 5, second frame 510 includes an S' subframe 540 in subframe 5, and third frame 515 includes an S' subframe 560 in subframe 5. Accordingly, in an implementation shown in FIG. 5, a transmitting device may have CCA opportunities during subframes 0 and 5. In other examples, additional component carriers may be present, which may provide CCA opportunities in still additional subframes. According to some examples, various eNBs, such as eNBs 105, 205, and/or UEs 115, 215 of FIGS. 1 and 2, and/or other transmitters that may transmit in the unlicensed spectrum may synchronize CCAs for different component carriers. Thus, a number of different eNBs and/or other transmitters may operate in a coordinated fashion to provide CCA opportunities that are synchronized.

In some examples, S' subframes 520, 540, and 560, as well as any other special subframes of other different component carriers, may be set according to a network configuration that is provided to the eNB and/or other transmitter, similarly as discussed above. Such a network configuration may include, for example, a listing of different component carrier frequency bands and a position of the S' subframe for each respective component carrier frequency band. The position of the S' subframe for each component carrier frequency band may be provided as a staggering offset, for example. In some examples, synchronization may also be applied to transmitters of different MNOs. A UE that operates in such a system may, according to some examples, receive configuration information including staggering information, such as staggering offsets for different component carriers, in a system information block (SIB) or RRC configuration/reconfiguration message.

In some examples one or more of the component carrier frequencies F1-F3 may have S' subframes with the same subframe offset, with at least one other component carrier frequency F1-F3 having an S' subframe with a different subframe offset. According to various examples, a CCA may be performed by the transmitter, such as an eNB, on each component carrier frequency F1-F3 separately, and thus such a transmitter may be configured to transmit a communications signal on first component carrier frequency F1 (e.g., downlink subframe 525 during subframe 5), while measuring received signals on the second and third component carrier frequencies F2-F3 to perform CCA on the second and third component carrier frequencies F2-F3 (e.g., during S' subframes 540, 560). The different component carrier frequencies F1-F3 may belong to the same frequency band (e.g., intra-band component carriers), or one or more of the component carrier frequencies F1-F3 may belong to a different frequency band (e.g., inter-band component carriers). In some examples, intra-band component carriers may be configured to have synchronized special subframes, so as to have synchronized CCA, while inter-band component carriers may be configured to have staggered special subframes. In other examples, non-contiguous component carrier frequencies may be configured with staggered subframes, while contiguous component carrier frequencies may be configured to have synchronized special subframes.

Figure 6:
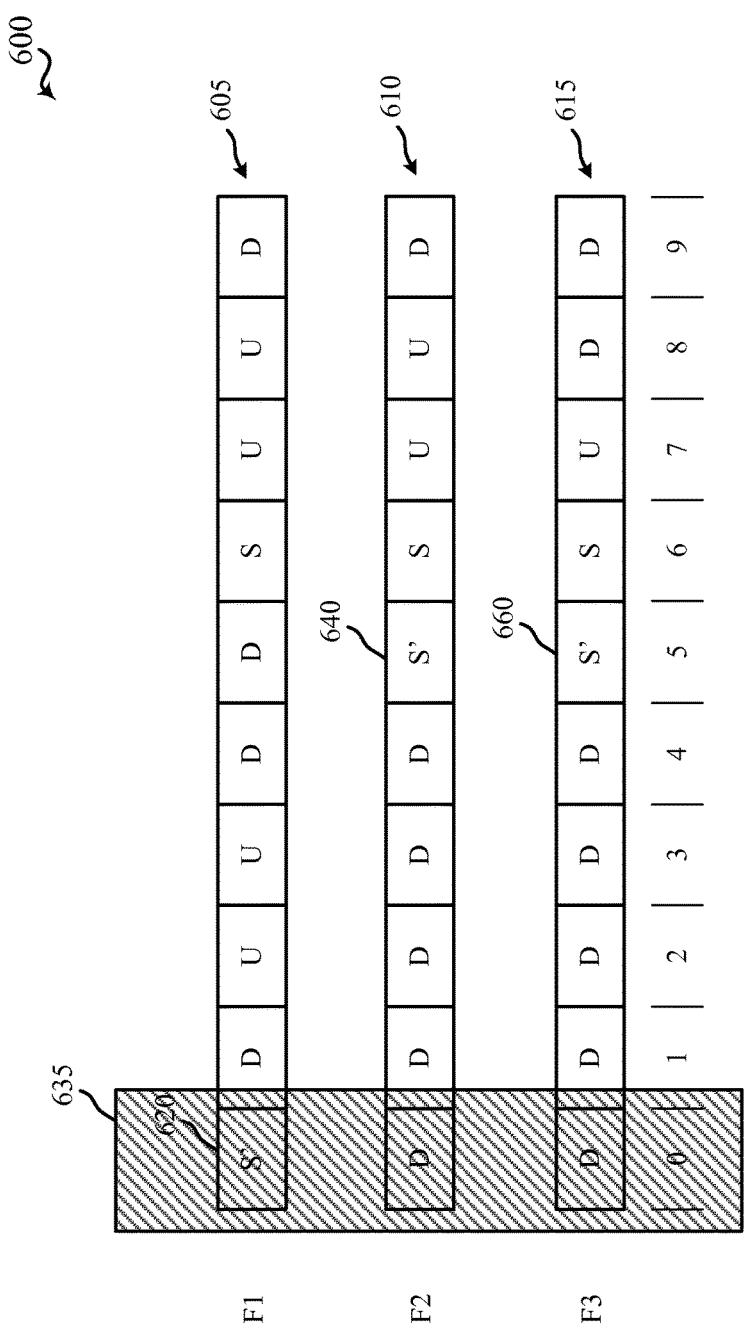
FIG. 6 illustrates an example of different carrier aggregation or stand alone mode component carriers in an unlicensed spectrum, and staggered CCA opportunities that may allow faster channel access in the event of interference, according to various examples.

FIG. 6 illustrates an example staggering pattern 600 of CCA opportunities for multiple component carriers in a CA or SA mode using an unlicensed spectrum, and in which interference may be present during a CCA subframe, according to various examples. In particular, the example of FIG. 6 illustrates how in the event of interference during one of the CCA opportunities of one of the component carriers, a CCA may be performed on another component carrier to gain channel access. As shown in FIG. 6, frames 605-615 may be transmitted using multiple component carriers on frequencies F1-F3. Each frame 605, 610, and 615 includes a corresponding special (S') subframe 620, 640, and 660, that each may include one or more CCA slots (e.g., time slots) in which the transmitting devices contending for a particular channel of an unlicensed spectrum may perform their CCAs.

In the example of FIG. 6, interference 635 is shown as being present during subframe 0. The observed interference may, for example, be interference from a WiFi transmitter and may cause the CCA operation on subcarrier frequency F1 to fail. However, a CCA performed during S' subframes 640 and 660 performed after the interference 635 stops may result in a successful CCA and lead to channel acquisition for the second and third component carriers transmitted on frequencies F2-F3. Thus, a transmitter, such as eNB 105, 205, and/or UE 115, 215, may have successful channel access of the second and third component carriers transmitted on frequencies F2-F3. After successfully gaining channel access on the second and third component carriers, the transmitter may re-attempt channel access for the first component carrier on frequency F1 in order to enhance the total bandwidth available for the CA and SA communications.

Figure 7A:
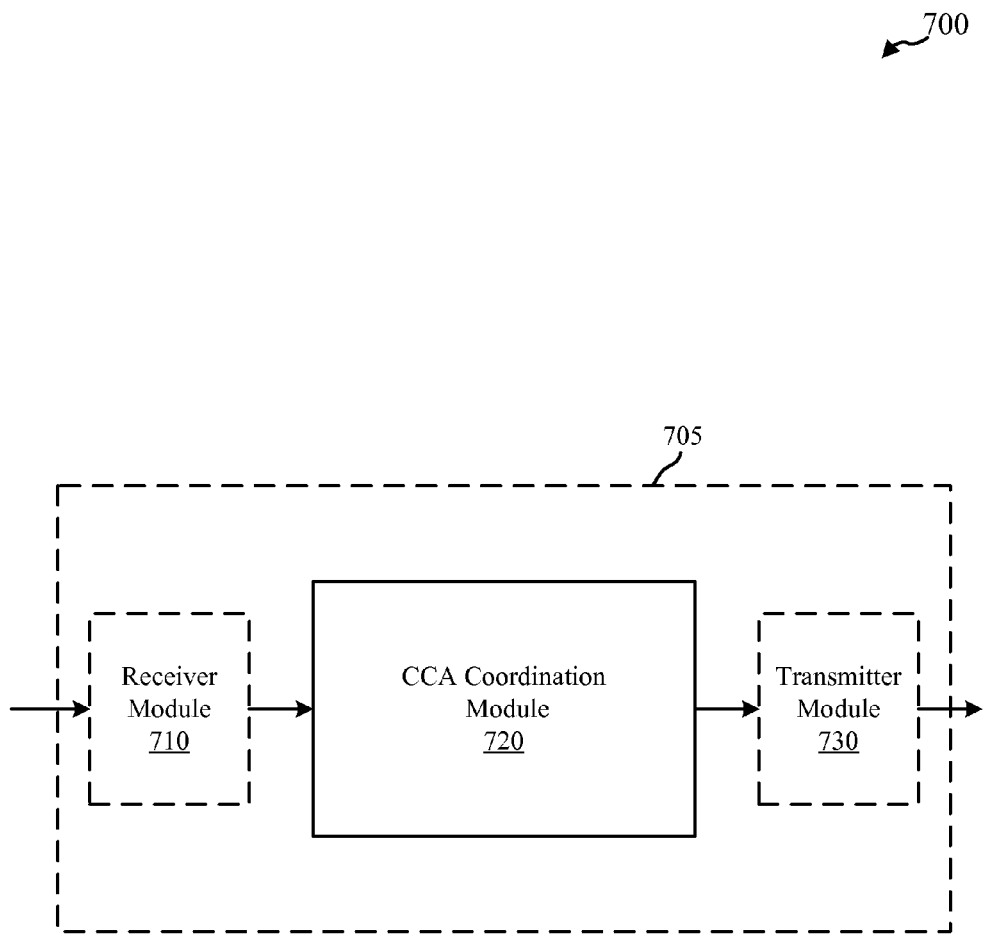
FIGS. 7A and 7B show block diagrams of examples of devices, such as eNBs or UEs, for use in wireless communications according to various examples.

Referring now to FIG. 7A, a block diagram 700 illustrates a device 705 for use in wireless communications in accordance with various examples. In some examples, the device 705 may be an example of one or more aspects of the eNBs 105, 205, and/or UEs 115, 215 described with reference to FIGS. 1 and/or 2. The device 705 may also be a processor. The device 705 may include a receiver module 710, a CCA coordination module 720, and/or a transmitter module 730. Each of these components may be in communication with each other.

The components of the device 705 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 710 may be or include a radio frequency (RF) receiver, such as an RF receiver operable to receive transmissions in a licensed spectrum and/or an unlicensed spectrum. The receiver module 710 may be used to receive various types of data and/or control signals (i.e., transmissions) over one or more communication links of a wireless communications system including the licensed and unlicensed spectrums, such as one or more communication links of the wireless communications system 100 and/or 200 described with reference to FIGS. 1 and/or 2.

In some examples, the transmitter module 730 may be or include an RF transmitter, such as an RF transmitter operable to transmit in the licensed spectrum and/or the unlicensed spectrum. The transmitter module 730 may be used to transmit various types of data and/or control signals (i.e., transmissions) over one or more communication links of a wireless communications system, such as one or more communication links of the wireless communications system 100 and/or 200 described with reference to FIGS. 1 and/or 2.

In some examples, the CCA coordination module 720 may configure and/or perform CCA on each of a number of different component carriers according to a CCA offset for each particular component carrier. When the CCA coordination module 720 determines that the unlicensed spectrum is to be used in communications on multiple component carriers, CCA staggering may be determined for the different component carriers based on the received staggering offset and the component carriers may be transmitted and/or received according to the determined CCA staggering pattern. The transmission may include, for example, transmitting special subframes within one or more CCA slots, with the location of each special subframe within a transmitted data frame being determined according to a CCA offset that may be defined, for example, in a network configuration for a particular carrier frequency. Receiving transmissions on multiple component carriers may include receiving one or more data frames in which a special subframe is determined according to a staggering offset that may be provided in, for example, RRC configuration/reconfiguration information, a SIB, or some network configuration. In some cases, the CCA staggering offset may be provided by an eNB or other entity.

Figure 7B:
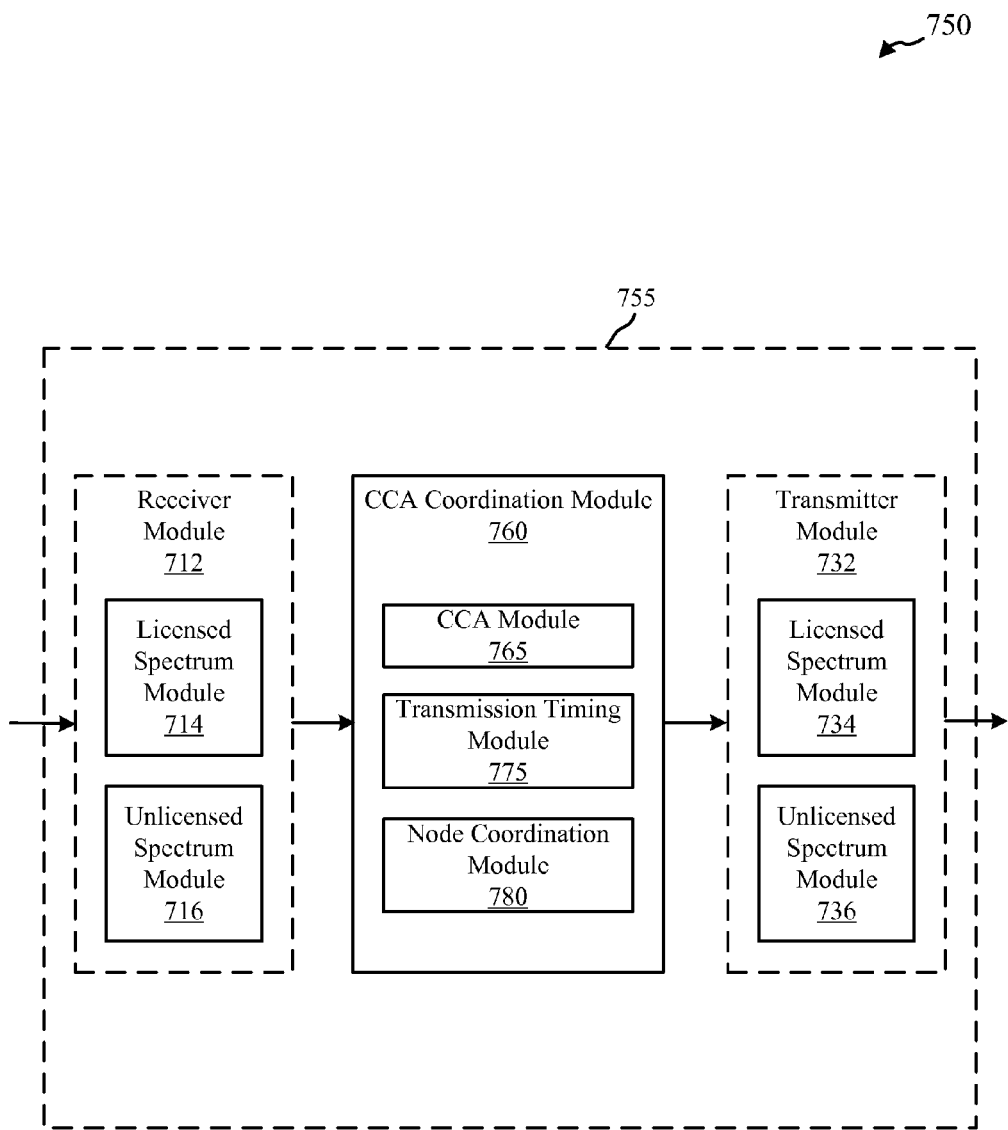

Referring now to FIG. 7B, a block diagram 750 illustrates a device 755 for use in wireless communications in accordance with various examples. In some examples, the device 705 may be an example of one or more aspects of the eNBs 105, 205, and/or UEs 115, 215 described with reference to FIGS. 1 and/or 2. The device 705 may also be a processor. The device 755 may include a receiver module 712, a CCA coordination module 760, and/or a transmitter module 732. Each of these components may be in communication with each other.

The components of the device 755 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 712 may be an example of the receiver module 710 of FIG. 7A. The receiver module 712 may be or include a radio frequency (RF) receiver, such as an RF receiver operable to receive transmissions in a licensed spectrum and/or an unlicensed spectrum. The RF receiver may include separate receivers for the licensed spectrum and the unlicensed spectrum. The separate receivers may in some cases take the form of a licensed spectrum module 714 and an unlicensed spectrum module 716. The receiver module 712, including the licensed spectrum module 714 and the unlicensed spectrum module 716, may be used to receive various types of data and/or control signals (i.e., transmissions) over one or more communication links of a wireless communications system including the licensed and unlicensed spectrums, such as one or more communication links of the wireless communications system 100 and/or 200 described with reference to FIGS. 1 and/or 2.

In some examples, the transmitter module 732 may be an example of the transmitter module 730 of FIG. 7A. The transmitter module 732 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 734 and an unlicensed spectrum module 736. The transmitter module 732 may be used to transmit various types of data and/or control signals (i.e., transmissions) over one or more communication links of a wireless communications system, such as one or more communication links of the wireless communications system 100 and/or 200 described with reference to FIGS. 1 and/or 2.

The CCA coordination module 760 may be an example of the CCA coordination module 720 described with reference to FIG. 7A and may include a CCA module 965, a transmission timing module 775, and/or a node coordination module 780. Each of these components may be in communication with each other.

In some examples, the CCA module 765 may perform CCA to determine availability of an unlicensed spectrum of each of a number of component carriers. The CCA may be performed during a special subframe identified for each component carrier transmitted over the unlicensed spectrum according to a CCA staggering offset for each particular component carrier. CCA staggering may be determined by CCA module 765 for the different component carriers according to a CCA staggering pattern that may be determined by transmission timing module 775. Transmission timing module 775 may determine a timing for one or more special subframes, or CCA subframes, on each component carrier during which CCA may be performed. The timing of the special subframes may be determined by the transmission timing module 775 based on a frequency band of one or more of the component carriers. For example, component carriers belonging to a same frequency band or having contiguous frequencies may have synchronized CCA subframes while non-contiguous or inter-band component carriers may have staggered CCCA subframes. The subframe configuration for component carriers may, in some examples, be provided to transmission timing module 775 in, for example, RRC configuration/reconfiguration information, a SIB, or some network configuration. In some cases, the CCA staggering offset may be provided by an eNB or other entity.

In some examples, the node coordination module 780 may assist in establishing coordination between the device 755 and other devices or nodes. For example, the node coordination module 780 may assist with synchronizing CCA opportunities of the device 755 with other devices or nodes forming a coordinated set of nodes. The node coordination module 780 may also determine when the device 755 should perform CCA. In some examples, node coordination module 780 may coordinate with nodes operated by one particular network operator to provide synchronized CCA opportunities component carriers transmitted by various different transmitters of the network operator. Node coordination module may also coordinate with nodes operated by other network operators to provide synchronized CCA opportunities for transmitters operated by each network operator.

Figure 8:
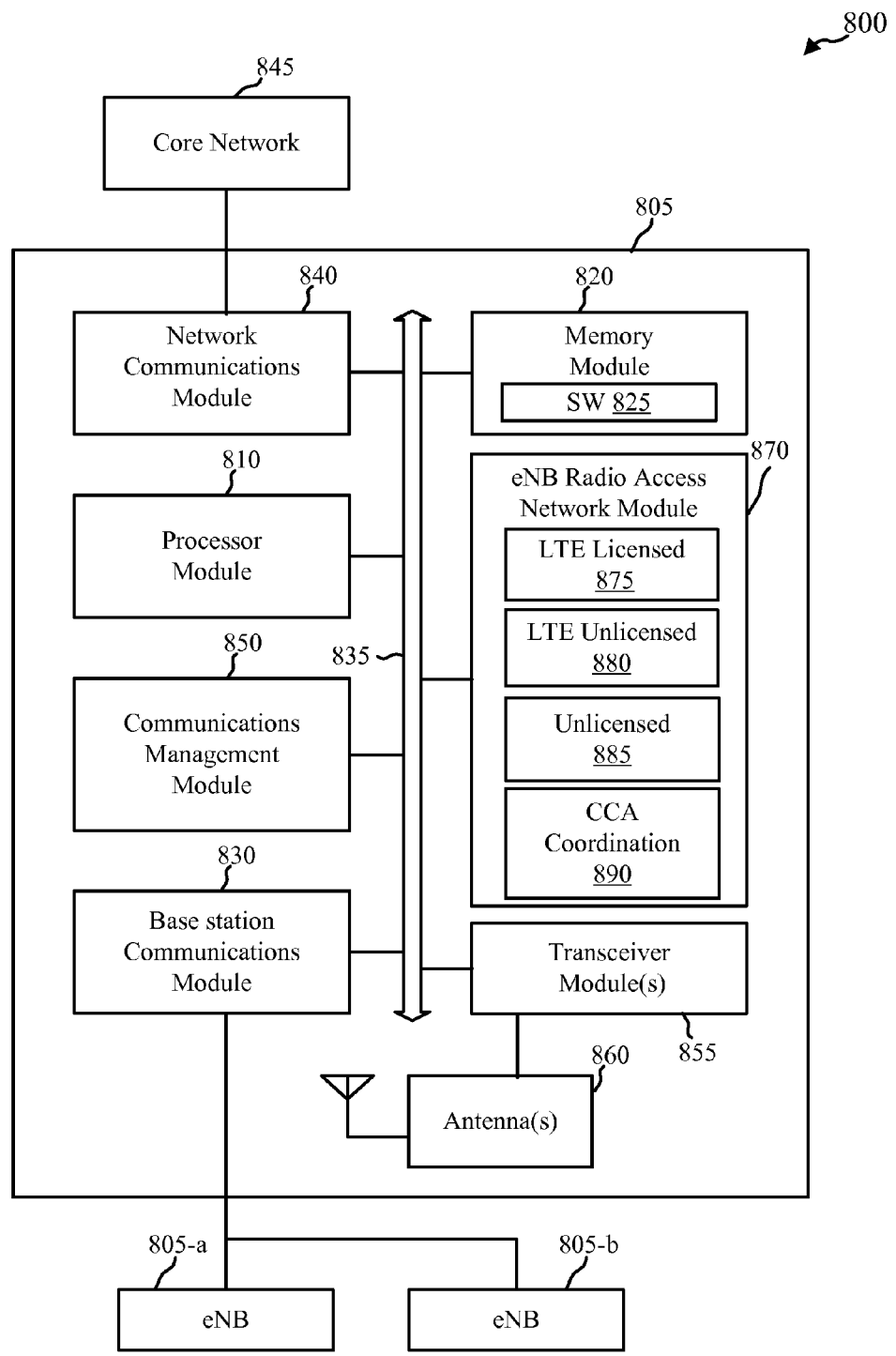
FIG. 8 shows a block diagram that illustrates an example of an eNB architecture according to various examples.

Turning to FIG. 8, a block diagram 800 is shown that illustrates an eNB 805 configured for LTE communications over the unlicensed spectrum. In some examples, the eNB 805 may be an example of one or more aspects of the eNBs or devices 105, 205, 705, and/or 755 described with reference to FIGS. 1, 2, 7A, and/or 7B. The eNB 805 may be configured to implement at least some of the CCA coordination and staggering features and functions over the unlicensed spectrum described with respect to FIGS. 1, 2, 3, 4, 5, 6, 7A, and/or 7B. The eNB 805 may include a processor module 810, a memory module 820, at least one transceiver module (represented by transceiver module(s) 855), at least one antenna (represented by antenna(s) 860), and/or an eNB radio access network module 870. The eNB 805 may also include one or both of a base station communications module 830 and a network communications module 840. Each of these components may be in communication with each other, directly or indirectly, over one or more buses 835.

The memory module 820 may include random access memory (RAM) and/or read-only memory (ROM). The memory module 820 may store computer-readable, computer-executable software (SW) code 825 containing instructions that are configured to, when executed, cause the processor module 810 to perform various functions described herein for using LTE-based communications in a licensed and/or unlicensed spectrum, including the performance of CCA that may be staggered across multiple component carriers. Alternatively, the software code 825 may not be directly executable by the processor module 810 but be configured to cause the eNB 805, when compiled and executed, to perform various of the functions described herein.

The processor module 810 may include an intelligent hardware device, e.g., a central processing unit (CPU), a microcontroller, an ASIC, etc. The processor module 810 may process information received through the transceiver module(s) 855, the base station communications module 830, and/or the network communications module 840. The processor module 810 may also process information to be sent to the transceiver module(s) 855 for transmission through the antenna(s) 860, to the base station communications module 830 for transmission to one or more other base stations or eNBs 805-*a* and 805-*b*, and/or to the network communications module 840 for transmission to a core network 845, which may be an example of aspects of the core network 130 described with reference to FIG. 1. The processor module 810 may handle, alone or in connection with the eNB radio access network module 870, various aspects of using LTE-based communications in a licensed and/or unlicensed spectrum, including the performance of CCA that may be staggered across multiple component carriers.

The transceiver module(s) 855 may include a modem configured to modulate the packets and provide the modulated packets to the antenna(s) 860 for transmission, and to demodulate packets received from the antenna(s) 860. The transceiver module(s) 855 may be implemented as one or more transmitter modules and one or more separate receiver modules. The transceiver module(s) 855 may support communications in at least one licensed spectrum and in at least one unlicensed spectrum. The transceiver module(s) 855 may be configured to communicate bi-directionally, via the antenna(s) 860, with one or more of the UEs or devices 115 and/or 215 described with reference to FIGS. 1 and/or 2, for example. The eNB 805 may typically include multiple antennas 860 (e.g., an antenna array). The eNB 805 may communicate with the core network 845 through the network communications module 840. The eNB 805 may communicate with other base stations or eNBs, such as the eNBs 805-*a* and 805-*b*, using the base station communications module 830.

According to the architecture of FIG. 8, the eNB 805 may further include a communications management module 850. The communications management module 850 may manage communications with other base stations, eNBs, and/or devices. The communications management module 850 may be in communication with some or all of the other components of the eNB 805 via the bus or buses 835. Alternatively, functionality of the communications management module 850 may be implemented as a component of the transceiver module(s) 855, as a computer program product, and/or as one or more controller elements of the processor module 810.

The eNB radio access network module 870 may be configured to perform and/or control some or all of the eNB functions or aspects in the unlicensed spectrum described with reference to FIGS. 1, 2, 3, 4, 5, 6, 7A, and/or 7B related to using LTE-based communications in a licensed and/or unlicensed spectrum. For example, the eNB radio access network module 870 may be configured to support a transmission using multiple component carriers in a supplemental downlink mode, a carrier aggregation mode, and/or a stand-alone mode, and provide CCA operations according to a staggering offset for each of the component carriers. The eNB radio access network module 870 may include an LTE licensed module 875 configured to handle LTE communications over the licensed spectrum, an LTE unlicensed module 880 configured to handle LTE communications over unlicensed spectrum and CCA for component carriers, and/or an unlicensed module 885 configured to handle communications in an unlicensed spectrum other than LTE communications over the unlicensed spectrum. The eNB radio access network module 870 may also include a CCA coordination module 890 configured to perform, for example, any of the eNB CCA staggering and coordination functions described with reference to FIGS. 1, 2, 3, 4, 5, 6, 7A and/or 7B. The CCA coordination module 890 may be an example of similar modules (e.g., module 720 and/or module 760) described with reference to FIGS. 7A and/or 7B. The eNB radio access network module 870, or portions of it, may include a processor and/or some or all of the functionality of the eNB radio access network module 870 may be performed by the processor module 810 and/or in connection with the processor module 810.

Figure 9:
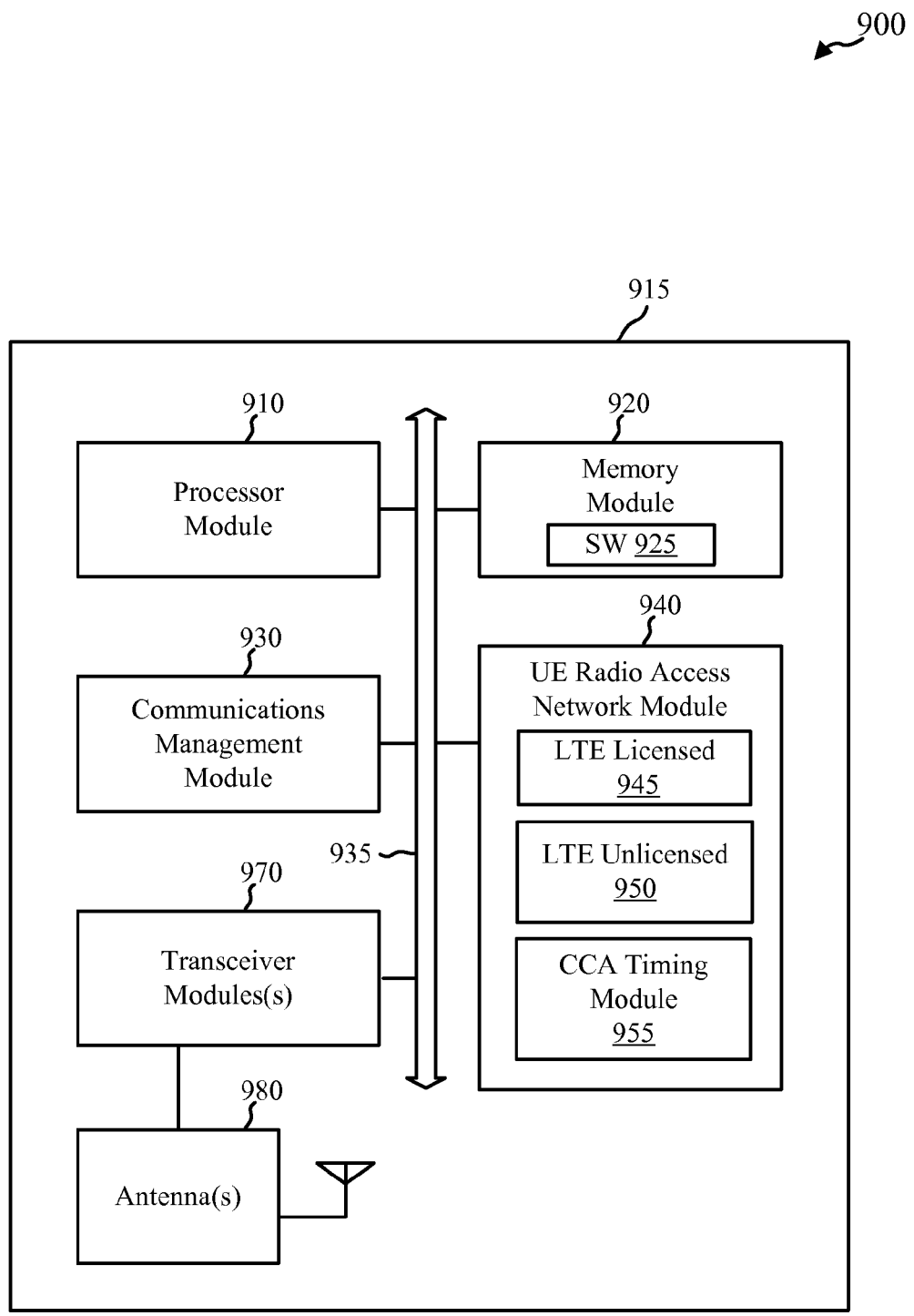
FIG. 9 shows a block diagram that illustrates an example of a UE architecture according to various examples.

Turning to FIG. 9, a block diagram 900 is shown that illustrates a UE 915 configured for LTE communications over an unlicensed spectrum. The UE 915 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 915 may have an internal power supply (not shown), such as a small battery, to facilitate mobile operation. In some examples, the UE 915 may be an example of one or more of the UEs or devices 115 and/or 215 described with reference to FIGS. 1 and/or 2. The UE 915 may be configured to communicate with one or more of the eNBs or devices 105, 205, 705, 755, and/or 805 described with reference to FIGS. 1, 2, 7A, 7B, and/or 8.

The UE 915 may include a processor module 910, a memory module 920, at least one transceiver module (represented by transceiver module(s) 970), at least one antenna (represented by antenna(s) 980), and/or a UE radio access network module 940. Each of these components may be in communication with each other, directly or indirectly, over one or more buses 935.

The memory module 920 may include RAM and/or ROM. The memory module 920 may store computer-readable, computer-executable software (SW) code 925 containing instructions that are configured to, when executed, cause the processor module 910 to perform various functions described herein for using LTE-based communications in a licensed and/or unlicensed spectrum. Alternatively, the software code 925 may not be directly executable by the processor module 910 but be configured to cause the UE 915 (e.g., when compiled and executed) to perform various of the UE functions described herein.

The processor module 910 may include an intelligent hardware device, e.g., a CPU, a microcontroller, an ASIC, etc. The processor module 910 may process information received through the transceiver module(s) 970 and/or information to be sent to the transceiver module(s) 970 for transmission through the antenna(s) 980. The processor module 910 may handle, alone or in connection with the UE radio access network module 940, various aspects of using LTE-based communications in a licensed and/or unlicensed spectrum.

The transceiver module(s) 970 may be configured to communicate bi-directionally with eNBs. The transceiver module(s) 970 may be implemented as one or more transmitter modules and one or more separate receiver modules. The transceiver module(s) 970 may support communications in at least one licensed spectrum and in at least one unlicensed spectrum. The transceiver module(s) 970 may include a modem configured to modulate the packets and provide the modulated packets to the antenna(s) 980 for transmission, and to demodulate packets received from the antenna(s) 980. While the UE 915 may include a single antenna, there may be examples in which the UE 915 may include multiple antennas 980.

According to the architecture of FIG. 9, the UE 915 may further include a communications management module 930. The communications management module 930 may manage communications with various base stations or eNBs. The communications management module 930 may be a component of the UE 915 in communication with some or all of the other components of the UE 915 over the one or more buses 935. Alternatively, functionality of the communications management module 930 may be implemented as a component of the transceiver module(s) 970, as a computer program product, and/or as one or more controller elements of the processor module 910.

The UE radio access network module 940 may be configured to perform and/or control some or all of the UE functions or aspects in the unlicensed spectrum described in FIGS. 1, 2, 3, 4, 5, 6, 7A, and/or 7B related to using LTE-based communications in a licensed and/or unlicensed spectrum. For example, the UE radio access network module 940 may be configured to support multiple component carriers in a supplemental downlink mode, a carrier aggregation mode, and/or a standalone mode. The UE radio access network module 940 may be configured to receive data frames on component carriers in which CCA subframes are transmitted according to a staggering offset, and/or perform CCA operations according to CCA opportunities determined by a CCA staggering offset of a particular component carrier. The UE radio access network module 940 may include an LTE licensed module 945 configured to handle LTE communications over the licensed spectrum, an LTE unlicensed module 950 configured to handle LTE communications over the unlicensed, and/or a CCA timing module 955. The CCA timing module 955 may be an example of similar modules (e.g., module 720 and/or module 760) described with reference to FIGS. 7A and/or 7B, and may coordinate the reception of CCA subframes transmitted according to a staggering offset across a set of component carriers, and/or may coordinate the performance of CCA operations according to the staggering offset across the set of component carriers. The UE radio access network module 940, or portions of it, may include a processor and/or some or all of the functionality of the UE radio access network module 940 may be performed by the processor module 910 and/or in connection with the processor module 910.

Figure 10:
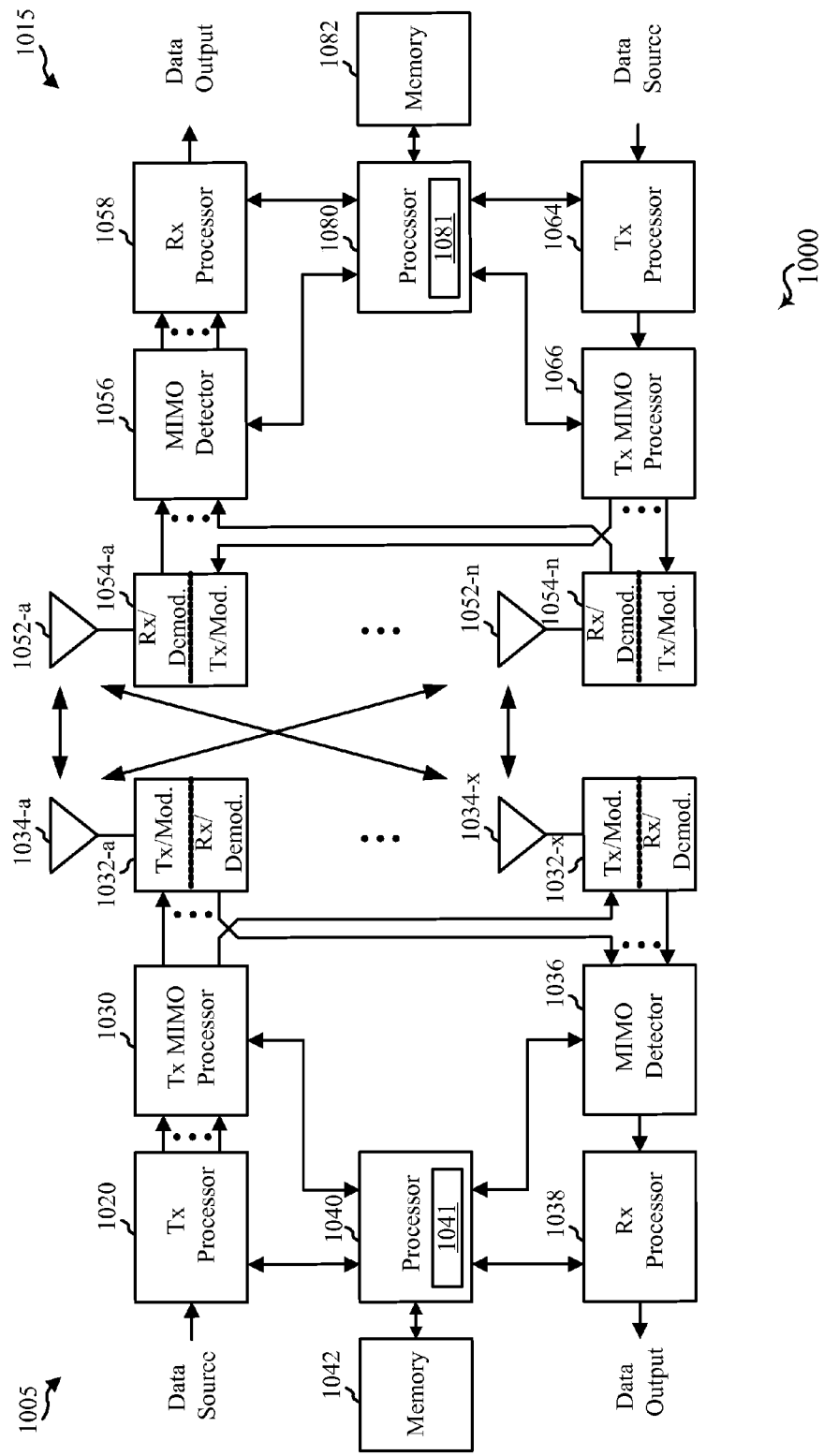
FIG. 10 shows a block diagram that illustrates an example of a multiple-input multiple-output (MIMO) communications system according to various examples.

Turning next to FIG. 10, a block diagram of a multiple-input multiple-output (MIMO) wireless communications system 1000 is shown including an eNB 1005 and a UE 1015. The eNB 1005 and the UE 1015 may support LTE-based communications using a licensed and/or unlicensed spectrum. The eNB 1005 may be an example of one or more aspects of the eNBs or devices 105, 205, 705, 755, and/or 805 described with reference to FIGS. 1, 2, 7A, 7B, and/or 8, while the UE 1015 may be an example of one or more aspects of the UEs or devices 115, 215, 705, 755, and/or 915 described with reference to FIGS. 1, 2, 7A, 7B, and/or 9. The wireless communications system 1000 may illustrate aspects of the wireless communications system 100 and/or 200 described with reference to FIGS. 1 and/or 2, and may perform CCA functions across multiple component carriers such as described with reference to FIGS. 3, 4, 5 and/or 6.

The eNB 1005 may be equipped with antennas 1034-$a$ through 1034-$x$, and the UE 1015 may be equipped with antennas 1052-$a$ through 1052-$n$. In the wireless communications system 1000, the eNB 1005 may be able to send data over multiple communication links at the same time. Each communication link may be called a "layer" and the "rank" of the communication link may indicate the number of layers used for communication. For example, in a 2×2 MIMO system where eNB 1005 transmits two "layers," the rank of the communication link between the eNB 1005 and the UE 1015 may be two.

At the eNB 1005, a transmit (Tx) processor 1020 may receive data from a data source. The transmit processor 1020 may process the data. The transmit processor 1020 may also generate reference symbols and/or a cell-specific reference signal. A transmit (Tx) MIMO processor 1030 may perform spatial processing (e.g., precoding) on data symbols, control symbols, and/or reference symbols, if applicable, and may provide output symbol streams to the modulator/demodulators 1032-$a$ through 1032-$x$. Each modulator/demodulator 1032 may process a respective output symbol stream (e.g., for OFDM, etc.) to obtain an output sample stream. Each modulator/demodulator 1032 may further process (e.g., convert to analog, amplify, filter, and upconvert) the output sample stream to obtain a downlink (DL) signal. In one example, DL signals from modulator/demodulators 1032-$a$ through 1032-$x$ may be transmitted via the antennas 1034-$a$ through 1034-$x$, respectively.

At the UE 1015, the antennas 1052-$a$ through 1052-$n$ may receive the DL signals from the eNB 1005 and may provide the received signals to modulator/demodulators 1054-$a$ through 1054-$n$, respectively. Each modulator/demodulator 1054 may condition (e.g., filter, amplify, downconvert, and digitize) a respective received signal to obtain input samples. Each modulator/demodulator 1054 may further process the input samples (e.g., for OFDM, etc.) to obtain received symbols. A MIMO detector 1056 may obtain received symbols from all the modulator/demodulators 1054-$a$ through 1054-$n$, perform MIMO detection on the received symbols if applicable, and provide detected symbols. A receive (Rx) processor 1058 may process (e.g., demodulate, deinterleave, and decode) the detected symbols, providing decoded data for the UE 1015 to a data output, and provide decoded control information to a processor 1080, or memory 1082. The processor 1080 may include a module or function 1081 that may perform various functions related to using LTE-based communications in a licensed and/or unlicensed spectrum. For example, the module or function 1041 may perform some or all of the functions of the CCA coordination module 720 or 760 described with reference to FIG. 7A or 7B, and/or of the UE radio access network module 940 described with reference to FIG. 9.

On the uplink (UL), at the UE 1015, a transmit (Tx) processor 1064 may receive and process data from a data source. The transmit processor 1064 may also generate reference symbols for a reference signal. The symbols from the transmit processor 1064 may be precoded by a transmit (Tx) MIMO processor 1066 if applicable, further processed by modulator/demodulators 1054-$a$ through 1054-$n$ (e.g., for SC-FDMA, etc.), and be transmitted to the eNB 1005 in accordance with the transmission parameters received from the eNB 1005. At the eNB 1005, the UL signals from the UE 1015 may be received by the antennas 1034, processed by the modulator/demodulators 1032, detected by a MIMO detector 1036 if applicable, and further processed by a receive (Rx) processor 1038. The receive processor 1038 may provide decoded data to a data output and to the processor 1040 or memory 1042. The processor 1040 may include a module or function 1041 that may perform various aspects related to using LTE-based communications in a licensed and/or unlicensed spectrum. For example, the module or function 1041 may perform some or all of the functions of the CCA coordination module 720 or 760 described with reference to FIG. 7A or 7B, or the eNB radio access network module 870 described with reference to FIG. 8. In some examples, the module or function 1041 may be used to determine a staggering offset for the eNB 1005's transmission of CCA subframes across a set of component carriers.

The components of the eNB 1005 may, individually or collectively, be implemented with one or more ASICs adapted to perform some or all of the applicable functions in hardware. Each of the noted modules may be a means for performing one or more functions related to operation of the wireless communications system 1000. Similarly, the components of the UE 1015 may, individually or collectively, be implemented with one or more ASICs adapted to perform some or all of the applicable functions in hardware. Each of the noted components may be a means for performing one or more functions related to operation of the wireless communications system 1000.

Figure 11:
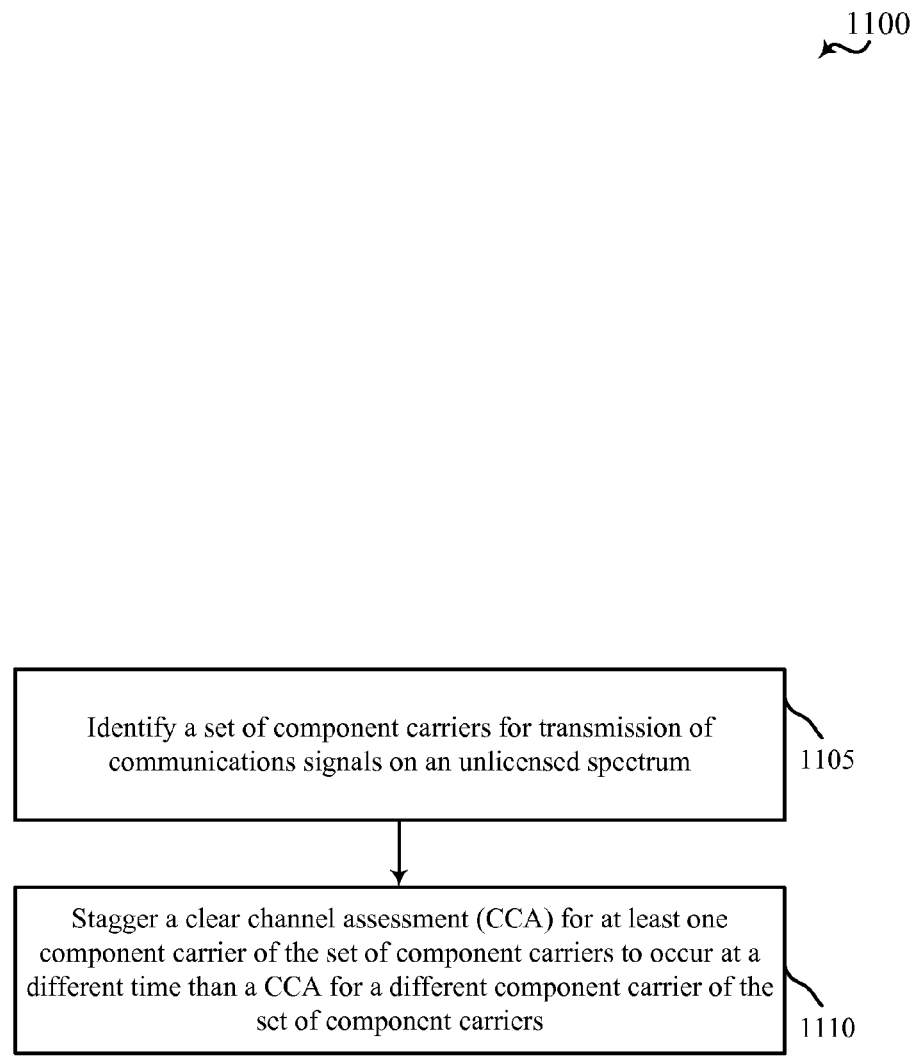
FIGS. 11 and 12 are flowcharts of examples of methods for wireless communications using unlicensed spectrum (e.g., at an eNB) according to various examples.

FIG. 11 is a flow chart illustrating an example of a method 1100 for wireless communications. For clarity, the method 1100 is described below with reference to ones of the eNBs or devices 115, 205, 705, 755, 805 and/or 1005 described with reference to FIGS. 1, 2, 7A, 7B, 8, and/or 10. In one example, an eNB may execute one or more sets of codes to control the functional elements of the eNB to perform the functions described below.

At block 1105, a set of component carriers is identified for transmission of communications signals on an unlicensed spectrum. The set of component carriers may be identified as carrier frequencies within a frequency band, or in different frequency bands. For example, component carriers may be transmitted using 20 MHz carrier frequencies within a 5 GHz frequency band. In some examples, the set of carrier frequencies may include one or more intra-band component carrier frequencies and one or more inter-band component carrier frequencies. The set of carrier frequencies may also include contiguous or dis-contiguous component carrier frequencies within a frequency band. The operation(s) at block 1105 may in some cases be performed using the CCA coordination module 720 and/or 760 described with reference to FIGS. 7A and/or 7B, the eNB radio access network module 870 described with reference to FIG. 8, and/or the module or function 1041 described with reference to FIG. 10.

At block 1110, a clear channel assessment (CCA) for at least one component carrier of the set of component carriers is staggered to occur at a different time than a CCA for a different component carrier of the set of component carriers. The operation(s) at block 1110 may in some cases be performed using the CCA coordination module 720 and/or 760 described with reference to FIGS. 7A and/or 7B, the eNB radio access network module 870 described with reference to FIG. 8, and/or the module or function 1041 described with reference to FIG. 10. The CCA staggering may be determined so as to provide multiple CCA opportunities across different component carrier frequencies in the set of carrier frequencies at different times.

In some examples, a staggering offset for each transmitted component carrier may be determined and signaling provided to receivers with information related to the staggering offset. Such information may be provided, for example, in RRC configuration/reconfiguration information, and/or in a SIB, for example. Thus, the method 1100 may provide for wireless communications in which CCA may be performed at different times for different component carriers, thereby providing additional opportunities for channel access in an unlicensed spectrum. It should be noted that the method 1100 is just one implementation and that the operations of the method 1100 may be rearranged or otherwise modified such that other implementations are possible.

Figure 12:
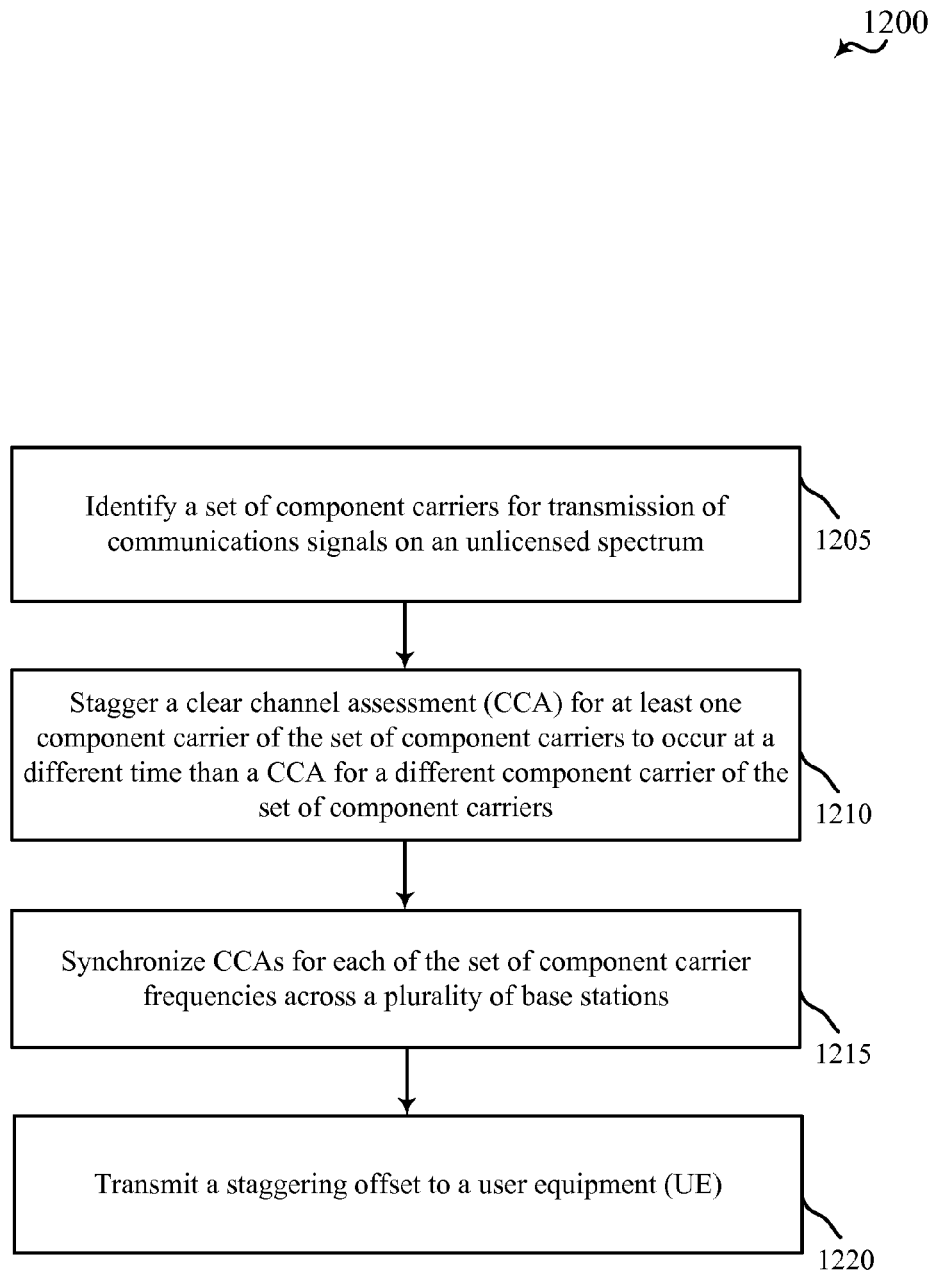

FIG. 12 is a flow chart illustrating an example of a method 1200 for wireless communications. For clarity, the method 1200 is described below with reference to ones of the eNBs or devices 105, 205, 705, 755, 805 and/or 1005 described with reference to FIGS. 1, 2, 7A, 7B, 8, and/or 10. In one example, an eNB may execute one or more sets of codes to control the functional elements of the eNB to perform the functions described below.

At block 1205, a set of component carriers is identified for transmission of communications signals on an unlicensed spectrum. The set of component carriers may be identified as carrier frequencies within a frequency band, or in different frequency bands. For example, component carriers may be transmitted using 20 MHz carrier frequencies within a 5 GHz frequency band. In some examples, the set of carrier frequencies may include one or more intra-band component carrier frequencies and one or more inter-band component carrier frequencies. The set of carrier frequencies may also include contiguous or dis-contiguous component carrier frequencies within a frequency band. The operation(s) at block 1105 may in some cases be performed using the CCA coordination module 720 and/or 760 described with reference to FIGS. 7A and/or 7B, the eNB radio access network module 870 described with reference to FIG. 8, and/or the module or function 1041 described with reference to FIG. 10.

At block 1210, a clear channel assessment (CCA) for at least one component carrier of the set of component carriers is staggered to occur at a different time than a CCA for a different component carrier of the set of component carriers. The operation(s) at block 1210 may in some cases be performed using the CCA coordination module 720 and/or 760 described with reference to FIGS. 7A and/or 7B, the eNB radio access network module 870 described with reference to FIG. 8, and/or the module or function 1041 described with reference to FIG. 10. The CCA staggering may be determined so as to provide multiple CCA opportunities across different component carrier frequencies in the set of carrier frequencies at different times.

At block 1215, CCAs for each of the set of component carrier frequencies are synchronized across a plurality of base stations. The synchronization of CCAs across base stations may provide synchronized and coordinated CCAs for each component carrier and thereby synchronize such operations across base stations. In some cases, the base stations may be operated by the same network operator, and in some cases one or more base stations of other network operators may also be synchronized. The operation(s) at block 1215 may in some cases be performed using the CCA coordination module 720 and/or 760 described with reference to FIGS. 7A and/or 7B, the eNB radio access network module 870 described with reference to FIG. 8, and/or the module or function 1041 described with reference to FIG. 10.

At block 1220, a staggering offset is transmitted to one or more unlicensed spectrum receivers. The operation(s) at block 1220 may in some cases be performed using the CCA coordination module 720 and/or the transmitter module 730 described with reference to FIG. 7A, the synchronization information transmission timing module 770, the transmission timing module 775, and or transmitter module 732 described with reference to FIG. 7B, the CCA coordination module 890, the transceiver module 855, and/or the antennas 860 described with reference to FIG. 8, and/or the module or function 1041, the Tx processor 1020, the Tx MIMO processor 1030, the modulator/demodulators 1032-$a$ through 1032-$x$, and/or the antennas 1034-$a$ through 1034-$x$ described with reference to FIG. 10.

Thus, the method 1200 may provide for wireless communications in which CCA may be performed at different times for different component carriers that is synchronized across base stations, thereby providing additional opportunities for channel access in an unlicensed spectrum. It should be noted that the method 1200 is just one implementation and that the operations of the method 1200 may be rearranged or otherwise modified such that other implementations are possible.

Figure 13:
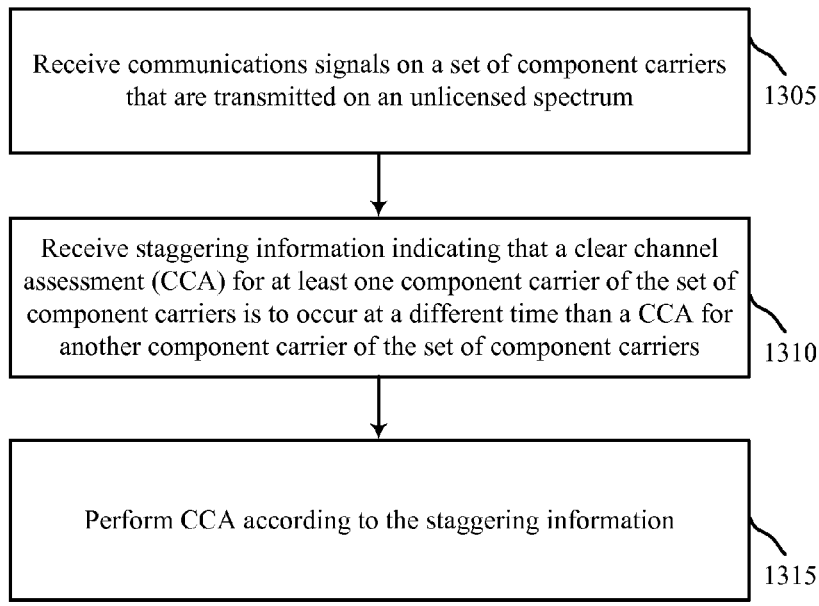
FIG. 13 is a flowchart of an example of a method for wireless communications using unlicensed spectrum (e.g., at a UE) according to various examples.

FIG. 13 is a flow chart illustrating an example of a method 1300 for wireless communications. For clarity, the method 1300 is described below with reference to ones of the UEs or devices 115, 215, 705, 755, 715 and/or 1015 described with reference to FIGS. 1, 2, 7A, 7B, 9, and/or 10. In one example, a UE may execute one or more sets of codes to control the functional elements of the UE to perform the functions described below.

At block 1305, communications signals are received on a set of component carriers that are transmitted on an unlicensed spectrum. The communications signals may be received from a transmitter, such as a base station or other transmitter capable of transmitting over an unlicensed spectrum, according to a SDL mode, a CA mode, or a SA mode operating using multiple component carriers. The operation(s) at block 1305 may in some cases be performed using the CCA coordination module 720 and/or 760 described with reference to FIGS. 7A and/or 7B, the UE radio access network module 940 described with reference to FIG. 9, and/or the module or function 1081 described with reference to FIG. 10.

At block 1310, staggering information is received indicating that a clear channel assessment (CCA) for at least one component carrier of the set of component carriers is to occur at a different time than a CCA for another component carrier of the set of component carriers. The staggering information may be provided to the UE in a SIB, or RRC configuration/reconfiguration message, for example. The operation(s) at block 1310 may in some cases be performed using the CCA coordination module 720 and/or 760 described with reference to FIGS. 7A and/or 7B, the UE radio access network module 940 described with reference to FIG. 9, and/or the module or function 1081 described with reference to FIG. 10.

At block 1315, CCA operations may be performed according to the staggering information. The CCA operations may include receiving a CCA subframe at the UE at a time determined from the staggering information, or performing CCA to determine channel availability. The operation(s) at block 1315 may in some cases be performed using the CCA coordination module 720 and/or 760 described with reference to FIGS. 7A and/or 7B, the UE radio access network module 940 described with reference to FIG. 9, and/or the module or function 1081 described with reference to FIG. 10.

Thus, the method 1300 may provide for wireless communications in which CCA may be performed at different times for different component carriers, thereby providing additional opportunities for channel access in an unlicensed spectrum. It should be noted that the method 1300 is just one implementation and that the operations of the method 1300 may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   identifying a set of component carriers for transmission of communications signals on an unlicensed spectrum; and
   determining a staggered clear channel assessment (CCA) timing for at least one component carrier of the set of component carriers such that CCAs performed on the at least one component carrier to gain access to a first carrier frequency occur at different times than CCAs performed on a different component carrier of the set of component carriers to gain access to a second carrier frequency.

2. The method of claim 1, further comprising:
synchronizing the staggered CCA timing across a plurality of base stations.

3. The method of claim 2, wherein the staggered CCA timing comprises:
staggering CCAs of the set of component carriers according to a staggering offset received as part of a network configuration.

4. The method of claim 3, further comprising:
transmitting the staggering offset to a user equipment (UE) in a system information block (SIB) or RRC configuration/reconfiguration message.

5. The method of claim 1, wherein the staggered CCA timing comprises
staggering a series of CCAs for at least one component carrier of the set of component carriers to occur at different times than a series of CCAs for at least one other of the set of component carriers.

6. The method of claim 1, wherein the communications signals transmitted on each component carrier comprise a plurality of frames, each of the plurality of frames including a CCA subframe, and wherein the staggered CCA timing comprises:
selecting different subframes as the CCA subframe for each component carrier.

7. The method of claim 1, wherein the set of component carriers comprises two or more secondary downlink (SDL) carriers, carrier aggregation (CA) carriers or stand alone (SA) carriers transmitted on the unlicensed spectrum and wherein each component carrier is configured to transmit the communications signals according to a time division duplex (TDD) transmission scheme with two or more of the component carriers having different TDD uplink/downlink (UL/DL) configurations.

8. The method of claim 1, further comprising staggering a clear channel assessment exempt transmission (CET) for the at least one component carrier to occur at a different time than a CET for the different component carrier of the set of component carriers.

9. The method of claim 1, further comprising:
transmitting a communications signal on a first component carrier; and
measuring, while transmitting the communications signal on the first component carrier, received signals on a second component carrier for performing a CCA.

10. The method of claim 1, wherein the set of component carriers comprise a first component carrier transmitted substantially at a first frequency and a second component carrier transmitted substantially at a second frequency and wherein the first frequency and the second frequency belong to different frequency bands, and wherein the staggered CCA timing comprises staggering CCAs of the first component carrier and the second component carrier to occur at different times.

11. The method of claim 10, wherein the first frequency and the second frequency are non-contiguous frequencies of a same frequency band, and wherein the staggered CCA timing comprises staggering CCAs of the first component carrier and the second component carrier to occur at different times.

12. A method for wireless communications, comprising:
receiving communications signals on a set of component carriers that are transmitted on an unlicensed spectrum;
receiving staggering information indicating that a clear channel assessment (CCA) for at least one component carrier of the set of component carriers to gain access to a first carrier frequency is to occur at a different time than a CCA for another component carrier of the set of component carriers to gain access to a second carrier frequency; and
performing CCA operations according to the staggering information.

13. The method of claim 12, wherein CCAs for each component carrier of the set of component carriers are staggered according to a staggering offset.

14. The method of claim 13, the receiving comprises:
receiving the staggering offset from a base station in a system information block (SIB) or RRC configuration/reconfiguration message.

15. The method of claim 12, wherein communications signals transmitted on each component carrier comprise a plurality of frames, each of the plurality of frames comprising a CCA subframe, and wherein the staggering information identifies different subframes for each component carrier as the CCA subframe.

16. The method of claim 12, wherein the set of component carriers comprises two or more secondary downlink (SDL) carriers transmitted on the unlicensed spectrum.

17. The method of claim 12, wherein the set of component carriers comprise a first component carrier transmitted substantially at a first frequency and a second component carrier transmitted substantially at a second frequency that belongs to a different frequency band than the first frequency, and wherein CCAs of the first component carrier and the second component carrier are staggered to occur at different times.

18. The method of claim 12, wherein the set of component carriers comprise a first component carrier transmitted substantially at a first frequency and a second component carrier transmitted substantially at a second frequency that belongs to a same frequency band as the first frequency, and wherein:
timing of CCAs of the first component carrier and the second component carrier are synchronized; and
one or more CCAs for one or more other component carriers of the set of component carriers are staggered to occur at a different time than the synchronized CCAs of the first component carrier and the second component carrier.

19. An apparatus for wireless communications, comprising:
a processor; and
memory communicatively coupled to the processor; wherein the processor is configured to:
identify a set of component carriers for transmission of communications signals on an unlicensed spectrum; and
determine a staggered clear channel assessment (CCA) timing for at least one component carrier of the set of component carriers such that CCAs performed on the at least one component carrier to gain access to a first carrier frequency occur at different times than CCAs performed on a different component carrier of the set of component carriers to gain access to a second carrier frequency.

20. The apparatus of claim 19, wherein the processor is further configured to synchronize the staggered CCA timing across a plurality of base stations and to stagger the CCAs of the set of component carriers according to a staggering offset received as part of a network configuration.

21. The apparatus of claim 19, wherein the processor is configured to stagger a series of CCAs for at least one component carrier of the set of component carriers to occur at different times than a series of CCAs for at least one other of the set of component carriers.

22. The apparatus of claim 19, wherein the communications signals transmitted on each component carrier comprise a plurality of frames, each of the plurality of frames including a CCA subframe, and wherein the processor is configured to select different subframes as the CCA subframe for each of the component carriers.

23. The apparatus of claim 19, wherein the set of component carriers comprises two or more secondary downlink (SDL) carriers, carrier aggregation (CA) or stand alone (SA) carriers transmitted on the unlicensed spectrum and wherein each component carrier is configured to transmit the communications signals according to a time division duplex (TDD) transmission scheme with two or more of the component carriers having different TDD uplink/downlink (UL/DL) configurations.

24. The apparatus of claim 19, wherein the processor is further configured to stagger a clear channel assessment exempt transmission (CET) for the at least one component carrier to occur at a different time than a CET for the different component carrier of the set of component carriers.

25. The apparatus of claim 19, wherein the processor is further configured to transmit a communications signal on a first component carrier, and measure, while transmitting the communications signal on the first component carrier, received signals on a second component carrier for performing a CCA.

26. An apparatus for wireless communications, comprising:
a processor; and
memory in electronic communication with the processor;
wherein the processor is configured to:
receive communications signals on a set of component carriers that are transmitted on an unlicensed spectrum;
receive staggering information indicating that a clear channel assessment (CCA) for at least one component carrier of the set of component carriers to gain access to a first carrier frequency is to occur at a different time than a CCA for another component carrier of the set of component carriers to gain access to a second carrier frequency; and
perform CCA operations according to the staggering information.

27. The apparatus of claim 26, wherein CCAs for each component carrier of the set of component carriers are staggered according to a staggering offset.

28. The apparatus of claim 27, wherein the processor is further configured to receive the staggering offset from a base station in a system information block (SIB) or RRC configuration/reconfiguration message.

29. The apparatus of claim 26, wherein the communications signals transmitted on each component carrier comprise a plurality of frames, each of the plurality of frames comprising a CCA subframe, and wherein the staggering information identifies different subframes for each component carrier as the CCA subframe.

30. The apparatus of claim 26, wherein the set of component carriers comprises two or more secondary downlink (SDL), carrier aggregation (CA) carriers, or stand along (SA) carriers transmitted on the unlicensed spectrum.

* * * * *